United States Patent
Ohara et al.

(10) Patent No.: US 9,434,368 B2
(45) Date of Patent: Sep. 6, 2016

(54) BRAKE APPARATUS

(71) Applicant: HITACHI AUTOMOTIVE SYSTEMS, LTD., Ibaraki (JP)

(72) Inventors: Tomohiro Ohara, Yokohama (JP); Wataru Yokoyama, Kawasaki (JP); Kenji Hashida, Zama (JP); Kimio Nishino, Atsugi (JP); Kenichiro Matsubara, Kasumigaura (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 69 days.

(21) Appl. No.: 14/458,528

(22) Filed: Aug. 13, 2014

(65) Prior Publication Data

US 2015/0120163 A1 Apr. 30, 2015

(30) Foreign Application Priority Data

Oct. 31, 2013 (JP) ................. 2013-227382

(51) Int. Cl.
| | |
|---|---|
| *B60T 13/74* | (2006.01) |
| *B60T 13/66* | (2006.01) |
| *B60T 7/04* | (2006.01) |
| *B60T 7/10* | (2006.01) |
| *F16D 65/18* | (2006.01) |
| *F16D 66/00* | (2006.01) |
| *F16D 121/02* | (2012.01) |
| *F16D 121/24* | (2012.01) |
| *F16D 125/40* | (2012.01) |
| *F16D 125/48* | (2012.01) |

(52) U.S. Cl.
CPC ............. *B60T 13/741* (2013.01); *B60T 7/042* (2013.01); *B60T 7/107* (2013.01); *B60T 7/108* (2013.01); *B60T 13/662* (2013.01); *F16D 65/18* (2013.01); *F16D 2066/001* (2013.01); *F16D 2066/005* (2013.01); *F16D 2121/02* (2013.01); *F16D 2121/24* (2013.01); *F16D 2125/40* (2013.01); *F16D 2125/48* (2013.01)

(58) Field of Classification Search
None
See application file for complete search history.

(56) References Cited

U.S. PATENT DOCUMENTS

| | | | | |
|---|---|---|---|---|
| 8,182,050 | B2 * | 5/2012 | Jackson | B60T 7/122 303/191 |
| 2004/0238299 | A1 * | 12/2004 | Ralea | B60T 7/085 188/156 |
| 2005/0077783 | A1 * | 4/2005 | Suzuki | B60T 7/107 303/89 |
| 2006/0131950 | A1 * | 6/2006 | Larson | B60T 8/00 303/7 |
| 2007/0194623 | A1 * | 8/2007 | Miyazaki | B60T 8/172 303/191 |
| 2008/0071457 | A1 * | 3/2008 | Shiraki | B60T 7/122 701/70 |

FOREIGN PATENT DOCUMENTS

JP 2012-192874 10/2012

* cited by examiner

*Primary Examiner* — John R Olszewski
*Assistant Examiner* — Nicholas K Wiltey
(74) *Attorney, Agent, or Firm* — Wenderoth, Lind & Ponack, L.L.P.

(57) ABSTRACT

When a controller (19) is restarted after system control has ended, a brake apparatus drives an electric motor (43) so as to achieve a corrected target thrust force calculated by setting a greater thrust force than a target thrust force set according to a temperature estimated value of a frictional member at this time, based on the temperature estimated value of the frictional member at the time of the end of the control, or drives the electric motor based on the temperature estimated value of the frictional member at the time of the end of the control.

14 Claims, 9 Drawing Sheets

BRAKE APPARATUS

BACKGROUND OF THE INVENTION

The present invention relates to a brake apparatus that provides a braking force to a vehicle such as an automobile.

As brake apparatuses mounted on vehicles such as automobiles, there are known brake apparatuses equipped with an electric parking brake function actuated (actuated to hold a braking force and actuated to release a braking force) based on driving of an electric motor. Such brake apparatuses are configured to, for example, advance a pressing member by the electric motor, and hold the advanced pressing member by a pressing member holding mechanism, thereby succeeding in maintaining a frictional member (a pad or a shoe) in abutment with a rotational member (a disk or a drum) on a wheel side (maintaining the braking force applied to the vehicle).

On the other hand, parking the vehicle for a long time results in reductions in temperatures of the disk rotor (the rotational member) and the brake pad (the frictional member) that were heated according to, for example, application of a braking force while the vehicle is running, thereby reducing thermal expansion amounts of the disk rotor and the brake pads (causing to the disk rotor and the brake pads to thermally contract). Japanese Patent Application Public Disclosure No. 2012-192874 (hereinafter referred to as Patent Literature 1) discusses a brake apparatus configured to set a zero point position, based on which a brake pad is displaced, in consideration of a reduction in a thermal expansion amount of a disk rotor, when an ignition is turned on. More specifically, Patent Literature 1 discusses that, when the ignition is turned on, the brake apparatus estimates a present temperature of the disk rotor with use of a time period elapsed since the ignition was turned off last time, which is measured by a timer, and an ambient temperature, and calculates the thermal expansion amount based on this estimated temperature.

The conventional technique discussed in Patent Literature 1 requires power to be supplied to the timer for measuring the elapsed time period to calculate the thermal expansion amount even after the ignition is turned off. Therefore, if the vehicle is configured to stop the timer (stop power supply to the timer) at the same time when the ignition is turned off, the brake apparatus cannot correctly calculate the thermal expansion amount, and therefore may be unable to provide an appropriate thrust force (braking force).

SUMMARY OF INVENTION

The present invention has been contrived in consideration of the above-described problem with the conventional technique, and an object of the present invention is to provide a brake apparatus capable of applying an appropriate thrust force (braking force) when the ignition is turned on next time, i.e., when the system is restarted, without requiring the timer to measure the elapsed time period after the ignition is turned off, i.e., after system control is ended.

To achieve the above-described object, according to an aspect of the present invention, a brake apparatus includes at least a pair of brake mechanisms each configured to thrust a frictional member disposed so as to be able to abut against each of rotational members configured to rotate together with at least a pair of wheels of a vehicle, with use of a pressing member based on an operation performed on a brake pedal, a pressing member holding mechanism configured to thrust the pressing member by an electric motor and hold the pressing member at the thrust position, an estimated temperature calculation device configured to estimate a temperature of the frictional member to calculate a temperature estimated value, and a controller electrically connected to the electric motor and configured to drive the electric motor in such a manner that a thrust force of the pressing member holding mechanism matches a target thrust force in response to an actuation request signal for actuating the pressing member holding mechanism to hold or release the pressing member. When a system of the controller is restarted after system control is ended, the controller drives the electric motor in such a manner that the thrust force of the pressing member holding mechanism matches a corrected target thrust force calculated by setting a greater thrust force than the target thrust force set according to the temperature estimated value of the frictional member at this time, based on the temperature estimated value of the frictional member at the time of the end of the control.

According to an aspect of the present invention, when the system of the controller is restarted after the system control is ended, the controller drives the electric motor based on the temperature estimated value of the frictional member at the time of the end of the control.

According to an aspect of the present invention, when the system of the controller is restarted after the system control is ended, the controller drives the electric motor in such a manner that the thrust force of the pressing member holding mechanism matches a target thrust force calculated by setting a greater thrust force than the target thrust force set according to the temperature estimated value at this time.

DESCRIPTION OF EMBODIMENTS

In the following description, brake apparatuses according to embodiments of the present invention will be described in detail with reference to the accompanying drawings based on an example in which they are mounted on a four-wheeled automobile.

Figure 1:
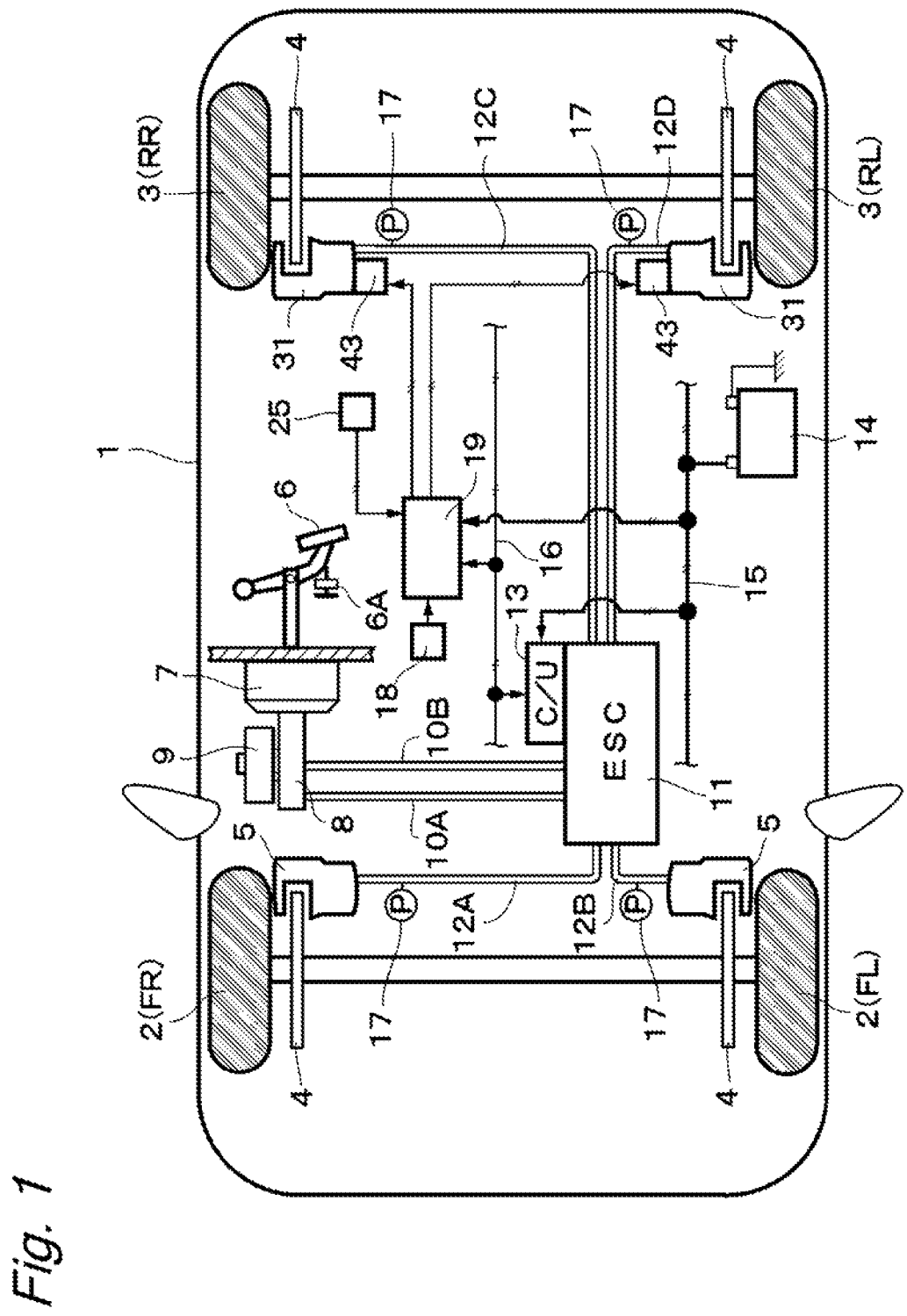
FIG. 1 illustrates a concept of a vehicle with a brake apparatus according to a first embodiment mounted thereon.

FIGS. 1 to 6 illustrate a first embodiment. Referring to FIG. 1, four wheels, for example, front left and right wheels 2 (FL and FR) and rear left and right wheels 3 (RL and RR) are disposed under a vehicle body 1 (on a road surface side), which constitutes a main structure of the vehicle. A disk rotor 4 is disposed at each of these front and rear wheels 2 and 3 as a rotational member (a disk) rotatable together with each of the wheels (each of the front and rear wheels 2 and 3). More specifically, each disk rotor 4 is sandwiched by a hydraulic disk brake 5 at each of the front wheels 2, and each disk rotor 4 is sandwiched by a hydraulic disk brake 31 equipped with an electric parking brake function, which will be described below, at each of the rear wheels 3. As a result, a barking brake is applicable to each of the wheels (each of the front and rear wheels 2 and 3).

A brake pedal 6 is disposed on a front board side of the vehicle body 1. The brake pedal 6 is operated by being pressed by an operator (a driver) when the driver brakes the vehicle. A brake pedal operation detection sensor (a brake sensor) 6A such as a pedal switch and a pedal stroke sensor are disposed at the brake pedal 6. This brake pedal operation detection sensor 6A detects whether the brake pedal 6 is operated by being pressed, and how much this operation is performed, and outputs a detection signal therefrom to a hydraulic supply apparatus controller 13, which will be described below. The brake pedal operation detection sensor 6A may be configured to output the detection signal to a parking brake controller 19, which will be described below.

A pressing operation performed on the brake pedal 6 is transmitted to a master cylinder 8 via a booster 7. The booster 7 is embodied by a negative pressure booster, an electric booster, or the like disposed between the brake pedal 6 and the master cylinder 8, and transmits a pressing force to the master cylinder 8 while increasing it when the pressing operation is performed on the brake pedal 6. At this time, the master cylinder 8 generates a hydraulic pressure with the aid of brake fluid supplied form a master reservoir 9. The master reservoir 9 corresponds to a hydraulic fluid tank containing the brake fluid. The mechanism for generating a hydraulic pressure by the brake pedal 6 is not limited thereto, and may be any mechanism that can generate a hydraulic pressure according to an operation performed on the brake pedal 6, such as a brake-by-wire type mechanism.

The hydraulic pressure generated in the master cylinder 8 is transmitted to a hydraulic supply apparatus 11 (the present embodiment will be described assuming that the hydraulic supply apparatus is embodied by an ESC by way of example, and the hydraulic supply apparatus 11 will be hereinafter referred to as the ESC 11) via, for example, a pair of cylinder-side hydraulic pipes 10A and 10B. This ESC 11 distributes and supplies the hydraulic pressure from the master cylinder 8 to the respective disk brakes 5 and 31 via brake-side pipe portions 12A, 12B, 12C, and 12D. As a result, a braking force is applied to each of the wheels (each of the front and rear wheels 2 and 3) as described above.

The ESC 11 is disposed between the respective disk brakes 5 and 31 and the master cylinder 8. The ESC 11 includes the hydraulic supply apparatus controller 13 (hereinafter referred to as the control, unit 13) that controls an operation of the ESC 11. The control unit 13 drives and controls the ESC 11, thereby supplying the brake fluid from the brake-side pipe portions 12A to 12D to the respective disk brakes 5 and 31 to perform control for increasing, reducing, or maintaining brake hydraulic pressures in the respective disk brakes 5 and 31. This operation realizes execution of brake control such as boosting control, braking force distribution control, brake assist control, anti-skid control, traction control, vehicle stability control including skid prevention, and hill start aid control.

The control unit 13 includes a microcomputer and the like, and power is supplied from a battery 14 to the control unit 13 via a power source line 15. Further, as illustrated in FIG. 1, the control unit 13 is connected to a vehicle data bus 16 or the like. The ESC 11 may be replaced with an ABS unit, which is a known art. Alternatively, the vehicle may be configured in such a manner that the ESC 11 is not disposed (omitted), and the master cylinder 8 is directly connected to the brake-side pipe portions 12A to 12D.

The vehicle data bus 16 includes a CAN as a serial communication unit mounted on the vehicle body 1, and performs in-vehicle multiplex communication among a large number of electric devices mounted on the vehicle, the control unit 13, the parking brake controller 19 that will be described below, and the like. In this case, examples of vehicle information transmitted to the vehicle data bus (CAN) 16 include information such as detection signals from a steering angle sensor, an accelerator sensor (an accelerator pedal operation detection sensor), a throttle sensor, an engine rotational sensor, the brake sensor (the brake pedal operation detection sensor 6A), a wheel speed sensor, a vehicle speed sensor, an inclination sensor, a G sensor (an acceleration sensor), a stereo camera, a millimeter-wave radar, a seat belt sensor, a transmission sensor, and the like. Further, this information includes detection signals (information) from pressure sensors 17 and the like.

The pressure sensors 17 are disposed at the brake-side pipe portions 12A, 12B, 12C, and 12D, respectively. The pressure sensors 17 respectively independently detect pressures (hydraulic pressures) in the respective pipe lines, i.e., hydraulic pressures (wheel cylinder hydraulic pressures) in calipers 34 (cylinder portions 36), which will be described below, corresponding to the pressures in these pipe lines. The vehicle may be configured to include a single pressure sensor 17 or two pressure sensors 17. For example, the vehicle may be configured in such a manner that the pressure sensors 17 are disposed, for example, only at the cylinder-side hydraulic pipes 10A and 10B between the master cylinder 8 and the ESC 11 (to detect the hydraulic pressure in the master cylinder).

A parking brake switch 18 is disposed at the vehicle body 1 so as to be located near a driver's seat (not illustrated), and this parking brake switch 18 is operated by the driver. The parking brake switch 18 functions to transmit a request for actuating a parking brake (a holding request and a release request) from the driver to the parking brake controller 19, which will be described below.

When the parking brake switch 18 is operated to a brake applying side (a parking brake ON side), i.e., when the holding request (a driving request) is issued from the driver, power is supplied to the disk brake 31 on each of the rear wheels 3 via the parking brake controller 19, which will be described below, for rotating an electric actuator 43, which will be described below, to a brake applying side. As a result, the disk brake 31 on each of the rear wheels 3 is placed into such a state that a braking force as the parking brake is applied, i.e., a holding state (an applying state). In the present disclosure, applying the parking brake, i.e., applying a braking force as the parking brake will be described with use of the term "hold". This term is used because a predetermined pressing force (a thrust force) is applied to a brake pad 33, which will be described below, by driving of the electric actuator 43, and positions of a piston 39 and the brake pad 33 at this time are held by a pressing member holding mechanism (a rotation-linear motion conversion mechanism 40).

On the other hand, when the parking brake switch 18 is operated to a brake releasing side (a parking brake OFF side), i.e., when the release request is issued from the driver, power is supplied to the disk brake 31 via the parking brake controller 19 for rotating the electric actuator 43 in a reverse direction of the direction when the parking brake is applied. As a result, the disk brake 31 on each of the rear wheels 3 is placed into such a state that application of the braking force as the parking brake is released, i.e., a brake stop state (a release state).

The parking brake can be configured to automatically apply (hold) the braking force based on an automatic holding request (an auto-holding request) issued according to a parking brake holding determination logic by the parking brake controller 19, for example, when the vehicle is stopped (for example, when the vehicle is maintained at a speed lower than 5 km/h for a predetermined time period), when an engine stops operating (an engine failure occurs), when a shift lever is operated into a P (parking) position, when a door is opened, or when a seat belt is unlocked. Further, the parking brake can be configured to automatically release the braking force based on an automatic release request (an auto-release request) issued according to a parking brake release determination logic by the parking brake controller 19, for example, when the vehicle starts running (for example, the vehicle is maintained at a speed of 5 km/h or higher for a predetermined time period), when an accelerator pedal is operated, when a clutch pedal is operated, or when the shift lever is operated to another position than the P and N (neutral) positions.

Figure 2:
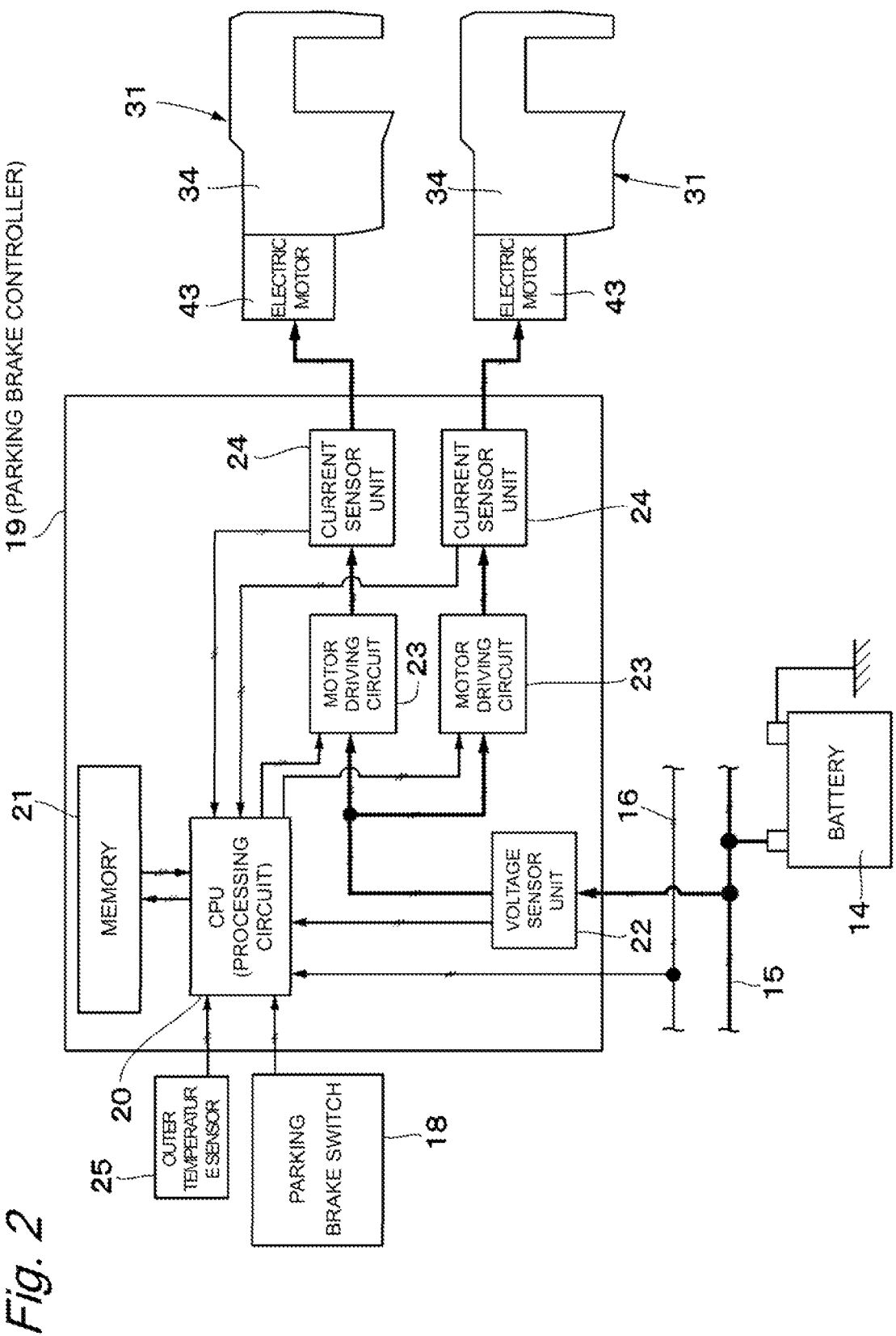
FIG. 2 is a block diagram illustrating a parking brake controller illustrated in FIG. 1.

The parking brake controller 19 constitutes an electric brake system (a brake apparatus) together with the pair of left and right disk brakes 31, which will be described below. As illustrated in FIG. 2, the parking brake controller 19 includes a processing circuit or unit (CPU) 20 embodied by a microcomputer or the like, and power is supplied from the battery 14 to the parking brake controller 19 via the power source line 15.

The parking brake controller 19 corresponds to a control, device (a controller or a control, unit). The parking brake controller 19 controls the electric actuator 43 of the disk brake 31, which will be described below, and generates the braking force (the parking brake or an auxiliary brake) when the vehicle is parked or stopped (even when the vehicle is running if necessary). In other words, the parking brake controller 19 actuates (holds or releases) the disk brake 31 as the parking brake (the auxiliary brake if necessary).

When the parking brake switch 18 is operated by the driver of the vehicle, the parking brake controller 19 drives the electric motor 43, which will be described below, based on a signal (an ON or OFF signal) output from the parking brake switch 18, thereby holding (applying) or stopping (releasing) the disk brake 31. Further, the parking brake controller 19 drives the electric actuator 43 to hold or release the disk brake 31 based on the above-described parking brake holding or release determination logic, in addition to the signal from the parking brake switch 18.

In this manner, in response to an "actuation request signal" including the signal from the parking brake switch 18 or the signal based on the above-described parking brake holding or release determination logic, i.e., an "actuation request signal" for requesting actuation (holding or release) of the parking brake, the parking brake controller 19 holds or releases the disk brake 31 according to this request. At this time, at the disk brake 31, the piston 39 and the brake pad 33 are held or released by the pressing member holding mechanism (the rotation-linear motion conversion mechanism 40) based on driving of the electric actuator 43. Therefore, the "actuation request signal" serves as a signal for actuating a holding or a release of the piston 39 and the brake pad 33 by the pressing member holding mechanism (the rotation-linear motion conversion mechanism 40).

In the first embodiment, to hold the disk brake 31, the parking brake controller 19 drives the electric actuator 43 in such a manner that a thrust force (a pressing force) of the brake pad 33 or to be applied to the brake pad 33 becomes greater than a target thrust force set according to a temperature estimated value (a pad temperature estimated value) of the brake pad 3 at this time. More specifically, the parking brake controller 19 drives the electric actuator 43 so as to achieve a corrected target thrust force calculated according to processing illustrated in FIG. 4, which will be described below (a thrust force calculated by adding a thrust force correction amount ΔF illustrated in FIG. 6 to the target thrust force set according to the pad temperature estimated value).

Figure 3:
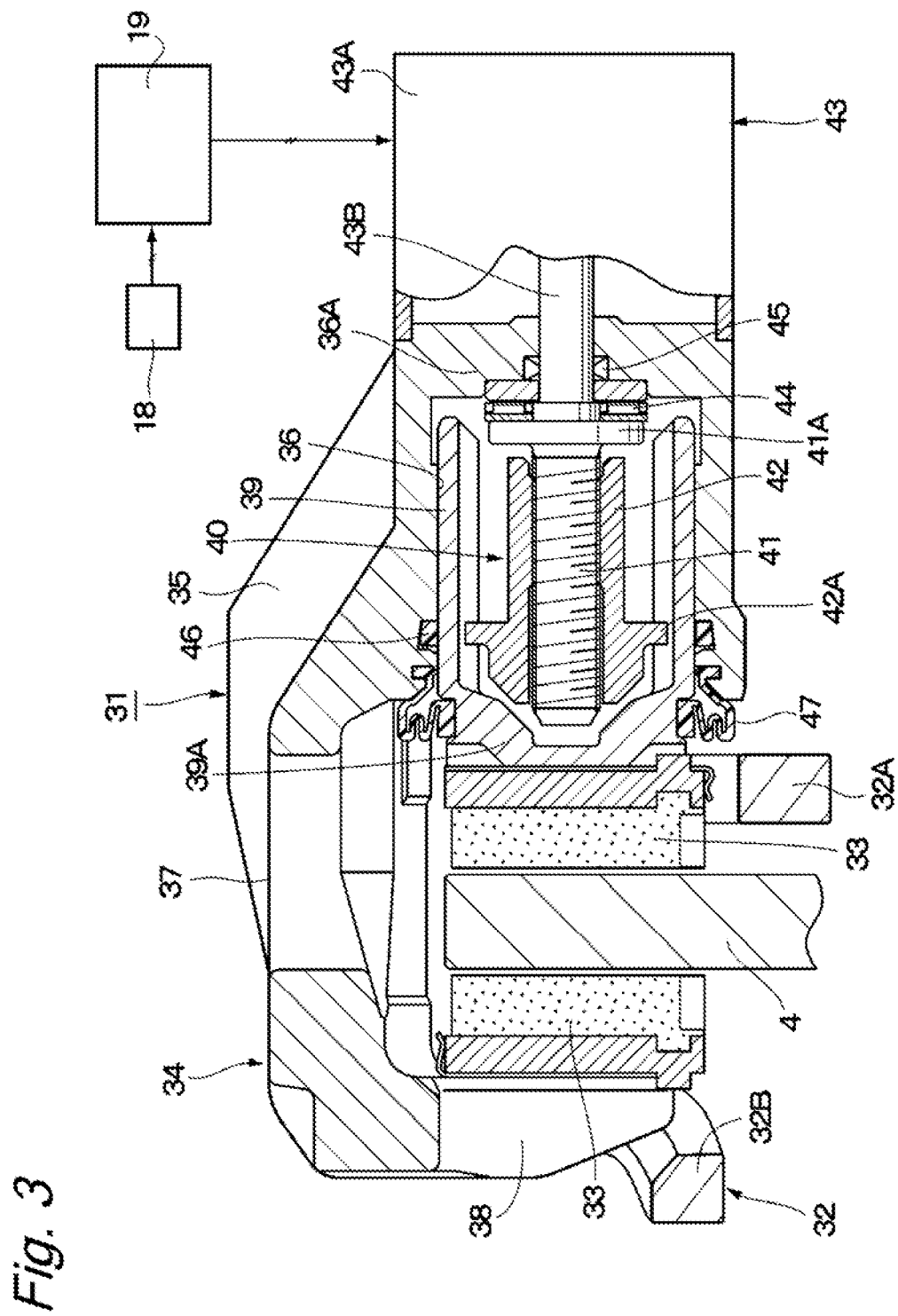
FIG. 3 is an enlarged vertical cross-sectional view illustrating a disk brake equipped with an electric parking brake function, which is mounted on a rear wheel side illustrated in FIG. 1.

As illustrated in FIGS. 1 to 3, an input side of the parking brake controller 19 is connected to the parking brake switch 18 and the like, and an output side of the parking brake controller 19 is connected to the electric actuators 43 and the like of the disk brakes 31. More specifically, as illustrated in FIG. 2, the parking brake switch 18, the vehicle data bus (CAN) 16, a voltage sensor unit 22 that will be described below, motor driving circuits 23, current sensor units 24, an outer temperature sensor 25, and the like, in addition to a storage unit (a memory) 21 that will be described below, are connected to the processing circuit (CPU) 20 of the parking brake controller 19. Various kinds of vehicle state amounts required to control (actuate) the parking brake, i.e., the above-described various kinds of vehicle information pieces can be acquired from the vehicle data bus 16.

Alternatively, the parking brake controller 19 (the processing circuit 20 thereof) may be configured to acquire the vehicle information by being directly connected to sensors that detect these information pieces (for example, the accelerator sensor, the throttle sensor, the engine rotational sensor, the brake sensor, the wheel speed sensor, the vehicle speed sensor, the G sensor, and the like), instead of acquiring it from the vehicle data bus 16. Further, the processing circuit 20 of the parking brake controller 19 can be configured to receive the actuation request signal from the parking brake switch 18 and another controller (for example, the control unit 13) connected to the vehicle data bus 16.

In this case, for example, the vehicle can be configured in such a manner that the other controller such as the control unit 13 determines whether to hold or release the parking brake according to the above-described determination logic, instead of the parking brake controller 19. In other words, the control content of the parking brake controller 19 can be integrated into the control unit 13.

The parking brake controller 19 includes the storage unit (the memory) 21 embodied by, for example, a flash memory, a ROM, a RAM, or an EEPROM (refer to FIG. 2). This storage unit 21 stores a program for the above-described parking brake holding or release determination logic, a program for the processing illustrated in FIG. 4 that will be described below, i.e., a program for the processing for calculating the target thrust force (the target thrust force set according to the temperature estimated value, and the corrected target thrust force) of an electric motor (the electric actuator 43), and the like. The storage unit 21 may be a memory provided in the parking brake controller 19 or a memory provided outside the parking brake controller 19.

Further, the storage unit 21 of the parking brake controller 19 stores the temperature estimated value of the brake pad 33 (the pad temperature estimated value), which is calculated by, for example, the parking brake controller 19 so as to be able to update this value for each control cycle. Further, when a system of the parking brake controller 19 is shut down, the temperature estimated value at this time is stored into the storage unit 21 as an end temperature estimated value (te). On the other hand, when the system of the parking brake controller 19 is started up (restarted), an outer temperature (an ambient temperature) at this startup is stored into the storage unit 21 as a start outer temperature (ts). The pad temperature estimated value, the end temperature estimated value (te), and the start outer temperature (ts) are stored into a nonvolatile storage device (a memory) that can keep its storage even when no power is supplied thereto, such as an EEPROM.

In the first embodiment, the parking brake controller 19 is prepared as another device than the control unit 13 of the ESC 11. However, the parking brake controller 19 and the control unit 13 may be configured as a single integrated device. Further, in the first embodiment, the parking brake controller 19 controls the two left and right disk brakes 31. However, the parking brake controller 19 may be provided for each of the left and right disk brakes 31. In this case, the parking brake controller 19 can be provided integrally with the disk brake 31.

As illustrated in FIG. 2, the parking brake controller 19 includes the voltage sensor unit 22 that detects a voltage of the power source line 15, the left and right motor driving circuits 23 and 23 that drive the left and right electric actuators 43 and 43, respectively, left and right current sensor units 24 and 24 that detect motor currents of the left and right electric actuators 43 and 43, respectively, and the like. These voltage sensor unit 22, motor driving circuits 23, current sensor units 24 are connected to the processing circuit 20, respectively.

This configuration allows the processing circuit 20 of the parking brake controller 19 to, for example, stop driving of the electric actuator 43 based on the motor current value of the electric actuator 43 when holding (applying) or stopping (releasing) the parking brake. In this case, when holding the parking brake, the processing circuit 20 determines that the piston 39 is placed into a held state by the rotation-linear motion conversion mechanism 40, for example, upon the motor current value reaching a holding threshold value (a current value corresponding to a thrust force required to be generated at this time), thereby stopping driving of the electric actuator 43. On the other hand, when releasing the parking brake, the processing circuit 20 determines that the piston 39 is placed into a released state from the rotation-linear motion conversion mechanism 43, for example, upon the motor current value reaching a preset release threshold value, thereby stopping driving of the electric actuator 40.

In the first embodiment, the parking brake controller 19 includes an estimated temperature calculation device that estimates the temperature of the brake pad 33 to calculate the temperature estimated value (the pad temperature estimated value) (corresponding to a process of step 4 illustrated in FIG. 4 that will be described below). The estimated temperature calculation device calculates an input heat amount and a released heat amount of the brake bad 33 based on, for example, the speed of the vehicle (the vehicle speed), the brake hydraulic pressure (the hydraulic pressure in the master cylinder or the hydraulic pressure in the wheel cylinder), and the outer temperature, and thereby can estimate (calculate) the temperature estimated value based on these input heat amount and released heat amount. In other words, the temperature of the brake pad 33 changes according to a state of the vehicle and a braking operation. For example, when the vehicle is braked (the braking force is applied to the vehicle) while being running, the pad temperature increases based on a friction between the brake pad 33 and the disk rotor 4. On the other hand, when the vehicle is stopped or the brake is released, the pad temperature decreases.

The input heat amount of the brake pad 33 can be calculated from frictional heat based on the vehicle speed and the brake hydraulic pressure.

On the other hand, the released heat amount of the brake pad 33 can be calculated by adding an amount of heat released to the atmosphere and an amount of heat released along the disk in consideration of the vehicle speed and an operating state of the brake (whether the brake pad 33 is pressed against the disk rotor 4). In the first embodiment, the parking brake controller 19 (the estimated temperature calculation device thereof) can be configured to calculate the temperature estimated value in real time by, for example, calculating a temperature change amount according to the released heat mount and the input heat mount based on the vehicle speed, the brake hydraulic pressure, and the outer temperature for each control cycle, and adding the temperature change amount of a present control cycle to the temperature change amount of an immediately preceding control cycle (updating the temperature change amount).

In the first embodiment, the outer temperature sensor 25 is connected to the processing circuit 20 of the parking brake controller 19 to allow the temperature of the brake pad 33 to be estimated. The outer temperature sensor 25 detects a temperature around the vehicle, i.e., for example, a temperature around the disk brake 31. The parking brake controller 19 calculates the temperature estimated value of the brake pad 33 with use of the outer temperature detected by the outer temperature sensor 25, and the vehicle speed and the hydraulic pressure in the master cylinder, which are acquired from, for example, the vehicle data bus 16. In addition, the parking brake controller 19 sets the outer temperature (ts) detected by the outer temperature sensor 25 as an initial value of the temperature estimated value of the brake pad 33, when the system is started up (restarted), as will be described below.

If the vehicle has the capability of acquiring the outer temperature from the vehicle data bus 16, the outer temperature sensor 25 does not have to be connected to the parking brake controller 19, and the outer temperature sensor 25 connected to be parking brake controller 19 may be omitted. Further, the temperature of the brake pad 33 can be estimated with use of, for example, the speed of the wheel (the wheel speed) and a deceleration of the vehicle detected by the acceleration sensor or the like, instead of the vehicle speed and the hydraulic pressure in the master cylinder. Further, for example, the parking brake controller 19 may be configured to estimate the temperature of the brake pad 33 with use of a technique for estimating a temperature of a brake rotor discussed in Japanese Patent Application Public Disclosure No. 2006-307994.

In the first embodiment, the parking brake controller 19 estimates the target thrust force according to the temperature estimated value of the brake pad 33 (the pad temperature estimated value), and drives the electric actuator 43 so as to achieve this target thrust force in response to the actuation request signal issued from the parking brake switch 18 or according to the above-described parking brake holding or release determination logic. In other words, the parking brake controller 19 calculates the target thrust force according to the temperature estimated value of the brake pad 33 at this time based on a relationship between the temperature of the brake pad 33 and the thrust force required to be generated by the disk brake 31 (the thrust force capable of maintaining the vehicle in a stopped state), and drives the electric actuator 43 so as to achieve this target thrust force.

In this case, when the system of the parking brake controller 19 is restarted after the control is ended, the parking brake controller 19 drives the electric actuator 43 while setting a greater thrust force than the target thrust force set according to the estimated temperature at this time based on the temperature estimated value at the time of the end of the control. Therefore, the parking brake controller 19 includes a control end unit that ends the control after storing the temperature estimated value at that time into the storage unit 21 as the end temperature estimated value (te) (corresponding to processes of steps 7 and 8 illustrated in FIG. 4 that will be described below), when the system control is ended (when the control of the vehicle system is ended).

Then, when the system is started up (restarted) after the control is ended, the parking brake controller 19 sets the outer temperature (ts) at the time of this startup as the temperature estimated value (the initial value thereof) (updates the temperature estimated value), and stores the outer temperature (ts) at the time of this startup into the storage unit 21 as the start outer temperature (ts). When the outer temperature (ts) at the time of the startup is set as the initial value of the temperature estimated value in this manner, as indicated by a broken line in FIG. 5 that will be described below, the temperature estimated value calculated (estimated) by the estimated temperature calculation device during the control may become lower than an actual temperature (a real temperature indicated by a solid line in FIG. 5). More specifically, after the system is started up, the temperature estimated value of the brake pad 3 approaches the actual temperature (the real temperature) according to passage of a driving time, use of the brake (application of the braking force), and the like. However, for example, immediately after the system is started up, a lower temperature than the actual temperature (the real temperature) may be estimated as the temperature estimated value of the brake pad 3 according to the temperature estimated value at the time of the end of the control, the elapsed time period from the shutdown to the startup of the system, the outer temperature at that time, and the like.

Therefore, upon receiving the actuation request signal, the parking brake controller 19 adds the thrust force correction amount ΔF (refer to FIG. 5 that will be described below) calculated based on a difference (a difference temperature value) between the end temperature estimated value (te) stored in the storage unit 21 at the time of the end of the control and the start outer temperature (ts), to the target thrust force set according to the temperature estimated value at this time. The thrust force correction amount ΔF is calculated based on the difference between the end temperature estimated value (te) and the start outer temperature (ts) according to a characteristic line graph illustrated in FIG. 6 that will be described below, i.e., a relationship between a temperature (t) and a thrust force (F) for calculating the thrust force correction amount ΔF.

Then, the parking brake controller 19 drives the electric actuator 43 so as to achieve the target thrust force (the corrected target thrust force) calculated by adding the thrust force correction amount ΔF to the target thrust force based on the temperature estimated value. In other words, the parking brake controller 19 drives the electric actuator 43 so as to achieve the target thrust force (the corrected target thrust force) increased from the target thrust force based on the temperature estimated value by the thrust force correction amount ΔF. As a result, the parking brake controller 19 can adjust the thrust force (the braking force as the parking brake) to be generated by driving of the electric actuator 43, to an appropriate one in consideration of the thrust force decreasing according to, for example, a reduction in the thermal expansion amount of the brake pad 33 (i.e. the parking brake controller 19 can increase the thrust force by an amount corresponding to this decrease). In this manner, the parking brake controller 19 controls the electric actuator 43 by calculating the target thrust force based on the temperature estimated value, calculating the thrust force correction amount ΔF, adding the thrust force correction amount ΔF to the target thrust force based on the temperature estimated value, and the like. This processing will be described in detail below.

Next, configurations of the disk brakes 31 and 31 equipped with the electric parking brake function, which are mounted on the left and right rear wheels 3 and 3, will be described with reference to FIG. 3. FIG. 3 illustrates only one of the left and right disk brakes 31 and 31 respectively mounted so as to correspond to the left and right rear wheels 3 and 3.

Each of the pair of disk brakes 31 respectively mounted on the left and right sides of the vehicle is configured as a hydraulic disk brake equipped with the electric parking brake function. The disk brake 31 includes a mount member 32 mounted on a non-rotatable portion of the rear wheel 3 of the vehicle, the inner-side and outer-side brake pads 33 as frictional members, and the caliper 34 as a brake mechanism containing the electric actuator 43, which will be described below. In this case, the disk brake 31 is configured to be able to thrust the piston 39, which will be described below, by the hydraulic pressure so that the piston 39 presses the brake pad 33, and also thrust the piston 39 by the electric actuator 43 in response to a braking request signal issued from the parking brake switch 18 or according to the above-described parking brake holding determination logic so that the brake pads 33 are pressed against the disk rotor 4 to then hold the pressing force of the piston 39, i.e., the pressing force of the brake pads 33.

The mount member 32 includes a pair of arm portions (not illustrated) extending in an axial direction of the disk rotor 4 (i.e., a disk axial direction) over an outer circumference of the disk rotor 4 and spaced apart from each other in a disk circumferential direction, a thick support portion 32A disposed so as to integrally connect proximal end sides of the respective arm portions with each other and fixed to the non-rotatable portion of the vehicle at a position on an inner side of the disk rotor 4, and a reinforcement beam 32B coupling distal end sides of the respective arm portions with each other at a position on an outer side of the disk rotor 4.

The inner-side and outer-side brake pads 33 correspond to the frictional members. The brake pads 33 are disposed so as to be able to abut against both surfaces of the disk rotor 4, and are supported so as to be movable in the disk axial direction by the respective arm portions of the mount member 32. The inner-side and outer-side brake pads 33 are pressed against the both surface sides of the disk rotor 4 by the caliper 34 (a caliper main body 35 and the piston 39), which will be described below.

The caliper 34 is disposed at the mount member 32 so as to extend over the outer circumferential side of the disk rotor 4. The caliper 34 generally includes the caliper main body 35 supported so as to be movable along the axial direction of the disk rotor 4 relative to the respective arm portions of the mount member 32, and the piston 39 disposed in the caliper main body 35. The rotation-linear motion conversion mechanism 40 and the electric actuator 43, which will be described below, are disposed in the caliper 34. The caliper 34 forms the brake mechanism that thrust the brake pad 33 by the piston 39 based on an operation performed on the brake pedal 6.

The caliper main body 35 includes the cylinder portion 36, a bridge portion 37, and a claw portion 38. The cylinder portion 36 is formed into a bottomed cylindrical shape having a closed end on one axial side thereof where a partition wall portion 36A is formed, and having an opening end on the other axial side thereof that faces the disk rotor 4. The bridge portion 37 is formed so as to extend over the outer circumferential side of the disk rotor 4 from the cylinder portion 36 in the disk axial direction. The claw portion 38 is arranged so as to extend on an opposite side of the bridge portion 37 from the cylinder portion 36.

The hydraulic pressure is supplied into the cylinder portion 36 of the caliper main body 35 via the brake-side pipe portion 12C or 12D illustrated in FIG. 1 according to a pressing operation performed on the brake pedal 6 or the like. The partition wall portion 36A is integrally formed at the cylinder portion 36 at a position between the cylinder portion 36 and the electric motor 43, which will be described below. An output shaft 43B of the electric motor 43 is rotatably inserted on an inner circumferential side of the partition wall portion 36A. The piston 39 as a pressing member, the rotation-linear motion conversion mechanism 40, which will be described below, and the like are disposed in the cylinder portion 36 of the caliper main body 35.

The first embodiment is configured in such a manner that the rotation-linear motion conversion mechanism 40 is contained in the piston 39. However, the rotation-linear motion conversion mechanism 40 does not necessarily have to be contained in the piston 39 as long as the piston 39 can be thrust by the rotation-linear motion conversion mechanism 40.

The piston 39 has an opening on one axial side, and this opening side is inserted in the cylinder portion 36. The other axial side of the piston 39 faces the inner-side brake pad 33, and is closed to form a cover portion 39A. The rotation-linear motion conversion mechanism 40 is contained within the piston 39 in the cylinder portion 36, and the piston 39 is configured to be thrust by the rotation-linear motion conversion mechanism 40 in an axial direction of the cylinder portion 36. The rotation-linear motion conversion mechanism 40 corresponds to the pressing member holding mechanism, and serves to thrust the piston 39 in the caliper 34 by an external force, i.e., the electric motor 43 instead of thrusting the piston 39 by the supply of the hydraulic pressure into the cylinder portion 36, and hold the thrust piston 39 and the brake pads 33 at the thrust position. Then, because the left and right disk brakes 31 are mounted so as to correspond to the left and right rear wheels 3, respectively, the rotation-linear motion conversion mechanisms 40 and the electric actuators 43 are also mounted on the left and right sides of the vehicle, respectively.

The rotation-linear motion conversion mechanism 40 includes a screw member 41 constituted by a rod-like body with a male screw such as a trapezoidal thread formed thereon, and a linearly movable member 42 serving as a thrust member with a female screw hole of a trapezoidal thread formed on an inner circumferential side thereof. In other words, the screw member 41 threadably engaged with the inner circumferential side of the linearly movable member 42 constitutes a screw mechanism for converting a rotational motion by the electric actuator 43, which will be described below, into a linear motion of the linearly movable member 42. In this case, the female screw of the linearly movable member 42 and the male screw of the screw member 41 are formed with use of highly irreversible screws, in particular, trapezoidal threads in the first embodiment, thereby realizing the pressing member holding mechanism. This pressing member holding mechanism (the rotation-linear motion conversion mechanism 40) is configured to hold the linearly movable member 42 (thus, the piston 39) at an arbitrary position with the aid of a frictional force (a holding force) within the rotation-linear motion conversion mechanism 40 even during a stop of power supply to the electric motor 43. The pressing member holding mechanism may be any mechanism that can hold the piston 39 at a position to which the piston 39 is thrust by the electric actuator 43. For example, the pressing member holding mechanism may be realized with use of another highly irreversible screw than the trapezoidal thread, such as a normal screw triangular in cross-section or a worm gear.

The screw member 41 disposed so as to be threadably engaged with the inner circumferential side of the linearly movable member 42 includes a flange portion 41A as a large-diameter flange on one axial side, and the other axial side of the linearly movable member 42 extends toward the cover portion 39A of the piston 39. The screw member 41 is integrally coupled to the output shaft 43B of the electric motor 43, which will be described below, on the one axial side thereof where the flange portion 41A is formed. Further, an engagement protrusion 42A is formed on an outer circumferential side of the linearly movable member 42. The engagement protrusion 42A prohibits the linearly movable member 42 from rotating relative to the piston 39 (prohibits a relative rotation) while allowing the linearly movable member 42 to axially move relative to the piston 39.

The electric actuator 43 as the electric motor (a parking brake actuator) is disposed in a casing 43A. This casing 43A is disposed so as to be fixed to the cylinder portion 36 of the caliper main body 35 at a position outside the partition wall portion 36A. The electric actuator 43 includes a motor including a stator, a rotor, and the like according to the known technique, and a reducer that amplifies a torque of the motor (all of them are not illustrated). The reducer includes the output shaft 43B that outputs the rotational torque after the amplification. The output shaft 43B axially extends through the partition wall portion 36A of the cylinder portion 36, and is coupled so as to be rotatable integrally with the flange portion 41A of the screw member 41 in the cylinder portion 36. If the motor can output a sufficient torque, the reducer may be omitted.

Coupling between the output shaft 43B and the screw member 41 may be configured, for example, so as to allow them to move in the axial direction but prevent them from rotating in the rotational direction. In this case, the output shaft 43B and the screw member 41 are coupled with each other using a known technique such as spline fitting or fitting using a polygonal rod (non-circular fitting). The reducer may be embodied by, for example, a planetary gear reducer or a worm gear reducer. Further, if the reducer is embodied by a known reducer unable to operate reversely (an irreversible reducer) such as a worm gear reducer, the rotation-linear motion conversion mechanism 40 can be embodied by a known reversible mechanism such as a ball screw or a ball ramp mechanism. In this case, the pressing member holding mechanism can be realized by, for example, the reversible rotation-linear motion conversion mechanism and the irreversible reducer.

When the parking brake switch 18 illustrated in FIGS. 1 and 3 is operated by the driver, power is supplied to the electric actuator 43 (the motor thereof) via the parking brake controller 19, thereby rotating the output shaft 43B of the electric actuator 43. Therefore, the screw member 41 of the rotation-linear motion conversion mechanism 40 is rotated integrally with the output shaft 43B in, for example, one direction, and thrusts (drives) the piston 39 toward the disk rotor 4 through the linearly movable member 42. As a result, the disk brake 31 sandwiches the disk rotor 4 between the inner-side and outer-side brake pads 33, thereby being placed into such a state that the disk brake 31 is applying the braking force as the electric parking brake, i.e., the holding state (the applying state).

On the other hand, when the parking brake switch 18 is operated toward the brake releasing side, the screw member 41 of the rotation-linear motion conversion mechanism 40 is rotationally driven by the electric actuator 43 in the other direction (the reverse direction). As a result, the linearly movable member 42 is driven (separated) away from the disk rotor 4 via the rotation-linear motion conversion mechanism 40, whereby the disk brake 31 is placed into such a state that application of the braking force as the parking brake is released, i.e., the brake stop state (the release state).

In this case, in the rotation-linear motion conversion mechanism 40, a relative rotation of the screw member 41 relative to the linearly movable member 42 causes the linearly movable member 42 to axially relatively move according to a rotational angle of the screw member 41 because the linearly movable member 42 is prohibited from being rotated in the piston 39. In this manner, the rotation-linear motion conversion mechanism 40 converts a rotational motion into a linear motion, which causes the linearly movable member 42 to thrust the piston 39. Further, in addition thereto, the rotation-linear motion conversion mechanism 40 holds the piston 39 and the brake pad 33 at positions to which they are thrust by the electric actuator 43, by holding the linearly movable member 42 at an arbitrary position with the aid of the frictional force.

A thrust bearing 44 is disposed on the partition wall portion 36A of the cylinder portion 36 between the partition wall portion 36A and the flange portion 41A of the screw member 41. This thrust bearing 44 serves to receive a thrust load from the screw member 41 together with the partition wall portion 36A, and facilitate a smooth rotation of the screw member 41 relative to the partition wall portion 36A. Further, a seal member 45 is disposed on the partition wall portion 36A of the cylinder portion 36 between the partition wall portion 36A and the output shaft 43B of the electric actuator 43. The seal member 45 seals between the partition wall portion 36A and the output shaft 43B so as to prevent the brake fluid in the cylinder portion 36 from leaking toward the electric actuator 43.

Further, a piston seal 46 as an elastic seal for sealing between the cylinder portion 36 and the piston 39, and a dust boot 47 for preventing a foreign object from entering into the cylinder portion 36 are disposed on the opening end side of the cylinder portion 36. The dust boot 47 is constituted by a flexible bellows-like seal member, and is attached between the opening end of the cylinder portion 36 and an outer circumference of the other axial side of the piston 39 where the cover portion 39A is formed.

The disk brakes 5 mounted on the front wheels 2 are configured in a substantially similar manner to the disk brakes 31 mounted on the rear wheels 3, except for the provision of the parking brake mechanism. In other words, the disk brakes 5 on the front wheels 2 do not include the rotation-linear motion conversion mechanism 40, the electric actuator 43, and the like that actuate (hold and release) the parking brake, unlike the disk brakes 31 on the rear wheels 3. However, except for that, the disk brakes 5 on the front wheels 2 are also configured in a substantially similar manner to the disk brakes 31. Further, the vehicle may be configured in such a manner that the disk brakes 31 equipped with the electric parking brake function are also mounted on the front wheels 2, instead of the disk brakes 5, depending on the situation or condition.

The first embodiment has been described based on the example in which this is applied to the hydraulic disk brake 31 including the caliper 34 containing the electric actuator 43. However, the present invention is not limited thereto, and may be applied to any brake mechanism that does not necessarily have to be configured according to the above-described embodiment, such as an electric disk brake including an electric caliper, an electric drum brake including an electric drum capable of applying a braking force with use of an electric actuator, and a disk brake equipped with an electric drum type parking brake, as long as the brake mechanism can press (thrust) the frictional member against the rotational member (the disk rotor) by the electric motor (the electric actuator) and hold this pressing force.

The brake apparatus of the four-wheeled automobile according to the first embodiment is configured in the above-described manner, and an operation thereof will be described next.

When the brake pedal 6 is operated by being pressed by the driver of the vehicle, this pressing force is transmitted to the master cylinder 8 via the booster 7, and a brake hydraulic pressure is generated by the master cylinder 8. The hydraulic pressure generated by the master cylinder 8 is distributed and supplied to the respective disk brakes 5 and 31 via the cylinder-side hydraulic pipes 10A and 10B, the ESC 11, and the brake-side pipe portions 12A, 12B, 12C, and 12D, thereby applying the braking forces onto the respective front left and right wheels 2 and the respective rear left and right wheels 3.

At this time, the disk brake 31 on each of the rear wheels 3 operates in the following manner. The hydraulic pressure is supplied into the cylinder portion 36 of the caliper 34 via the brake-side pipe portion 12C or 120, and the piston 39 is slidably displaced toward the inner-side brake pad 33 according to an increase in the hydraulic pressure in the cylinder portion 36. As a result, the piston 39 presses the inner-side brake pad 33 against one side surface of the disk rotor 4. A reaction force at this time causes the whole caliper 34 to be slidably displaced toward the inner side of the disk rotor 4 relative to the respective arm portions of the mount member 32.

As a result, the outer leg portion (the claw portion 38) of the caliper 34 moves so as to press the outer-side brake pad 33 against the disk rotor 4. The disk rotor 4 is sandwiched from axial both sides by the pair of brake pads 33, whereby the braking force is generated according to the supply of the hydraulic pressure. On the other hand, when the braking operation is released, the supply of the hydraulic pressure into the cylinder portion 36 is released and stopped, whereby the piston 39 is displaced so as to retract into the cylinder portion 36. Then, the inner-side and outer-side brake pads 33 are separated from the disk rotor 4, whereby the vehicle is returned into a non-braked state.

Next, when the parking brake switch 18 is operated toward the brake applying side (ON) by the driver of the vehicle, power is supplied from the parking brake controller 19 to the electric actuator 43 of the disk brake 31, whereby the output shaft 43B of the electric actuator 43 is rotationally driven. The disk brake 31 equipped with the electric parking brake converts the rotation of the electric actuator 43 into a linear motion through the screw member 41 and the linearly movable member 42 of the rotation-linear motion conversion mechanism 40 to axially move the linearly movable member 42 to thrust the piston 39, thereby pressing the pair of brake pads 33 against the both surfaces of the disk rotor 4.

At this time, the linearly movable member 42 is maintained in a brake applying state with the aid of the frictional force generated between the linearly movable member 42 and the screw member 41 with a pressing reaction force transmitted from the piston 39 serving as a normal force, whereby the disk brake 31 on each of the rear wheels 3 is actuated (applied) as the parking brake. In other words, even after a stop of the power supply to the electric actuator 43, the linearly movable member 42 (thus, the piston 39) can be held at the brake applying position by the female screw of the linearly movable member 42 and the male screw of the screw member 41.

On the other hand, when the parking brake switch 18 is operated toward the brake releasing side (OFF) by the driver, power is supplied from the parking brake controller 19 to the electric actuator 43 for rotating the motor in the reverse direction, whereby the output shaft 43B of the electric actuator 43 is rotated in the reverse direction of the direction at the time of actuation (application) of the parking brake. At this time, the rotation-linear motion conversion mechanism 40 releases holding of the braking force by the screw member 41 and the linearly movable member 42, and moves the linearly movable member 42 into the cylinder portion 36 in a return direction by a movement amount corresponding to the reverse rotation of the electric actuator 43, thereby releasing the braking force of the parking brake (the disk brake 31).

Each of the brake pads 33 thermally expands and thermally contracts depending on its temperature. More specifically, the brake pad 33 expands under high temperature and contracts under low temperature. Therefore, if the parking brake is applied with the brake pad 33 having a high temperature (thermally expanding), thermal contraction when the brake pad 33 is cooled down leads to a reduction in the force pressing the brake pad 33 against the disk rotor 4, i.e., the thrust force (the pressing force).

It is preferable to variably control (increase or reduce) the thrust force according to the temperature of the brake pad 33 at that time when the parking brake is applied so that, even when the thrust force is reduced due to such thermal contraction, a required thrust force can be ensured (the vehicle can be maintained in a stopped state) with this reduced thrust force. In this case, the temperature of the brake pad 33 can be estimated (calculated) based on the input heat amount and the released heat amount of the brake pad 33 according to, for example, the hydraulic pressure in the master cylinder, the vehicle speed, and the outer temperature while the vehicle is running. However, because an end of the control by the system (the vehicle system) due to shutdown of the engine, switch-off of an ignition key, power-off, or the like also causes an end of the estimation (the calculation) of the temperature of the brake pad 33 thereafter, the temperature of the brake pad 33 becomes unobservable, which leads to the possibility of generation of a difference between the actual temperature and the estimated temperature of the brake pad 33 after the system is restarted.

In this case, setting the target thrust force based on the temperature estimated value with such a difference made therein, and driving the electric actuator 43 of the disk brake 31 so as to achieve this target thrust force may result in insufficiency of the generated thrust force relative to an actually required thrust force. One possible method to solve this problem is estimating the temperature of the brake pad 33 after the system is restarted with use of the elapsed time period from the end of the system control to the restart of the system, and the outer temperature. However, this method requires power supply to a timer for measuring the elapsed time even after the end of the system control.

Figure 5:
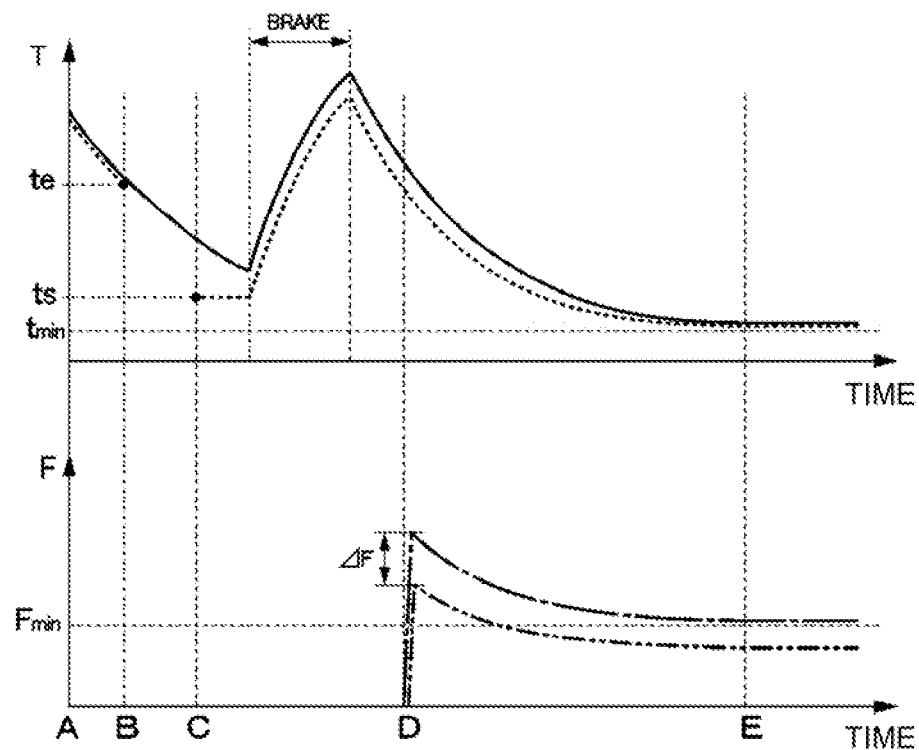
FIG. 5 is a graph illustrating characteristic lines that indicate examples of temporal changes in a pad temperature and a thrust force of a parking brake.

On the other hand, according to the first embodiment, the parking brake controller 19 drives the electric actuator 43 while causing the disk brake 31 to generate a greater thrust force (the force pressing the brake pad 33) than the target thrust force set according to the temperature estimated value at that time in response to the holding actuation request signal issued from the parking brake switch 18 or according to the above-described parking brake holding or release determination logic. More specifically, as illustrated in FIG. 5, in response to the actuation request signal for holding of the parking brake at time "D" on a temporal axis, the parking brake controller 19 calculates the thrust force correction amount $\Delta F$ that should be added to the target thrust force according to the characteristic line graph illustrated in FIG. 6 based on the difference (the difference temperature value) between the end temperature estimated value (te) stored into the storage unit 21 at time "B" on the temporal axis when the system is shut down before that, which is the temperature estimated value at that time, and the start outer temperature (ts) stored in the storage unit 21 at time "C" on the temporal axis when the system is started up, which is the outer temperature at that time. Then, the parking brake controller 19 drives the electric actuator 34 so as to achieve the corrected target thrust force, which is calculated by adding the thrust force correction amount $\Delta F$ to the target thrust force set according to the temperature estimated value at time "D" on the temporal axis. In FIG. 5, an upper side of a vertical axis indicates a relationship between the pad temperature (T) and the time (TIME). In particular, the solid line represents the actual temperature, and the broken line represents the temperature estimated value. Further, a lower side of the vertical axis indicates a relationship between the thrust force (F) of the parking brake and the time (TIME). In particular, an alternate long and short dash line represents the corrected thrust force, and an alternate long and two short dashes line represents the thrust force calculated based on the temperature estimated value (the thrust force before the correction).

In the following description, control processing performed by the processing circuit 20 of the parking brake controller 19 (processing for calculating the thrust force that should be generated) will be described with reference to FIG. 4.

Figure 4:
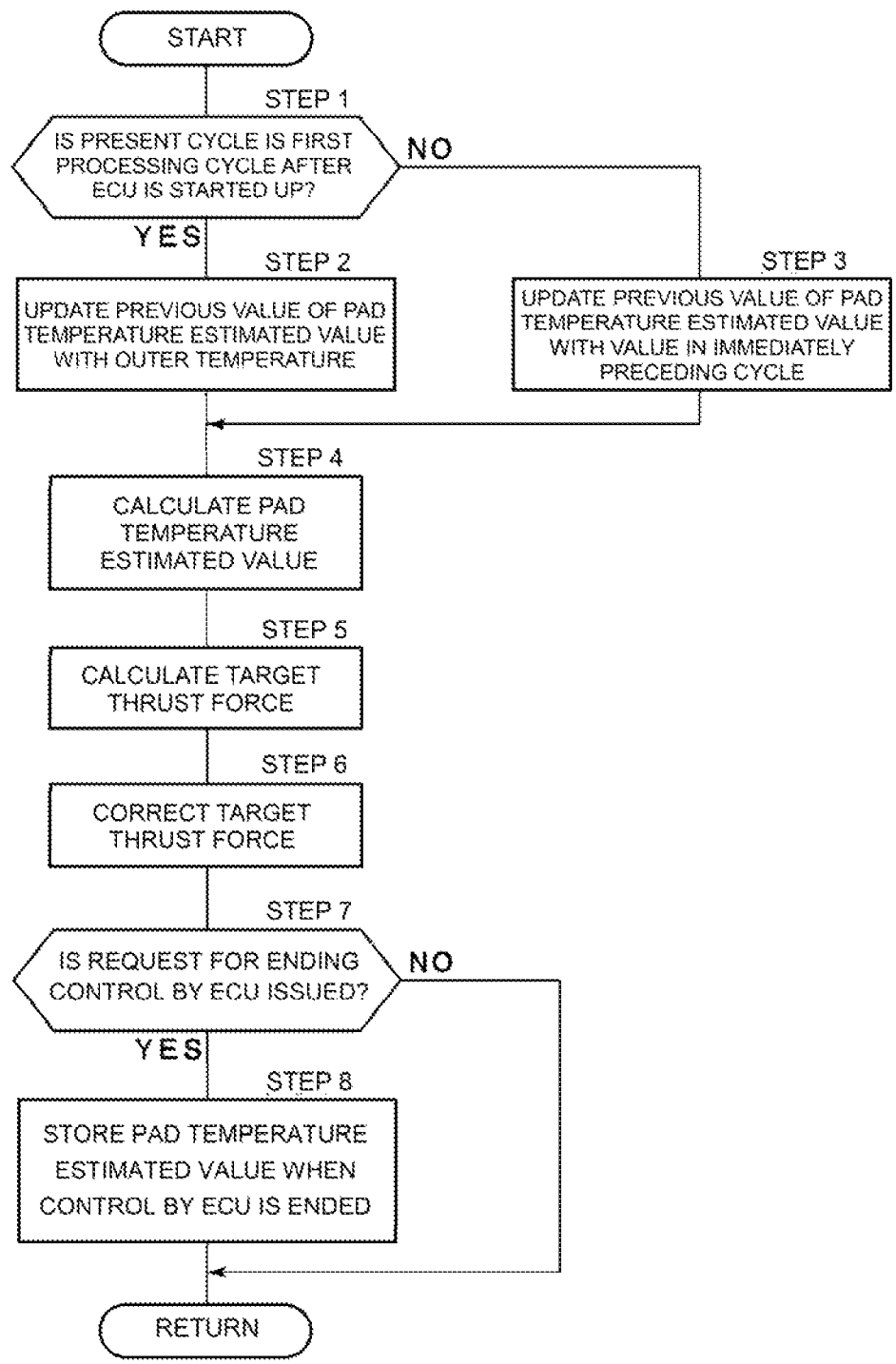
FIG. 4 is a flowchart illustrating control processing performed by the parking brake controller.

Upon a start of a processing operation illustrated in FIG. 4 according to, for example, startup of the system (startup of the vehicle system and startup of the parking brake controller 19) when an accessory is switched on, the ignition is turned on, the system is powered on, or the like based on an operation performed by the driver, in step 1, the processing circuit 20 determines whether the present cycle is the first control cycle after an ECU (the parking brake controller 19) is started up. If the processing circuit 20 determines "YES", i.e., determines that this cycle is the first control cycle after the ECU is started up (for example, time "C" on the temporal axis illustrated in FIG. 5) in step 1, the processing proceeds to step 2.

In step 2, the parking brake controller 19 updates a previous value of the temperature estimated value for use in estimation of the temperature of the brake pad 33 to be performed in step 4, which will be described below, with the outer temperature (ts) detected by the outer temperature sensor 25 at this time. In other words, the outer diameter (ts) detected by the outer temperature sensor 25 at this time (at the time of the startup) is set as the initial value of the temperature estimated value of the brake pad 33 (the pad temperature estimated value). Setting the outer temperature (ts) at the time of startup as the initial value of the temperature estimated value of the brake pad 33 in this manner may result in detecting a lower temperature than the actual temperature (the real temperature) as the estimated temperature (the temperature estimated value) as indicated in a time period from time "C" to time "E" on the temporal axis illustrated in FIG. 5. A reduction in the thrust force due to this difference of the estimated temperature (the temperature estimated value) is corrected to an appropriate thrust force by a target thrust force correction process in step 6, which will be described below.

On the other hand, if the processing circuit 20 determines "NO", i.e., determines that the present cycle is not the first processing cycle after the ECU is started up in step 1 (for example, during a time period from time "C" to time "D" on the temporal axis illustrated in FIG. 5) in step 1, the processing proceeds to step 3. In step 3, the processing circuit 20 updates the previous value of the temperature estimated value for use in estimation of the temperature of the brake pad 33 to be performed in step 4, which will be described below, with the pad temperature estimated value in an immediately preceding cycle (a cycle just before the present cycle).

After updating the previous value of the pad temperature estimated value in step 2 or step 3, in a subsequent step, step 4, the processing circuit 20 estimates the temperature of the brake pad 33 (calculates the pad temperature estimated value). More specifically, in step 4, the parking brake controller 19 calculates an amount of a change in the temperature of the brake pad 33 according to the released heat amount, and the input heat amount based on the vehicle speed, the hydraulic pressure in the master cylinder, and the outer temperature, and calculates the pad temperature estimated value in the present control cycle from this temperature change amount and the previous value of the pad temperature estimated value updated in step 2 or step 3.

In a subsequent step, step 5, the processing circuit 20 calculates the target thrust force that should be generated by the disk brake 31 based on the pad temperature estimated value calculated in step 4. The corresponding relationship between the pad temperature estimated value and the target thrust force is generated in advance as a map, a calculation equation, or the like from an experiment, a simulation, a calculation, and the like, and is stored in the storage unit 21. In step 5, the processing circuit 20 calculates the target thrust force from the pad temperature estimated value based on this map, calculation equation, or the like.

In step 6, the processing circuit 20 corrects the target thrust force calculated in step 5. In other words, in step 6, the processing circuit 20 calculates the corrected target thrust force that should be actually generated by the disk brake 31, by adding a thrust force error due to the error (difference) in the initially set temperature of the pad temperature estimated value to the target thrust force calculated in step 5. More specifically, the processing circuit 20 calculates the thrust force correction amount $\Delta F$ that should be added to the target thrust force from the characteristic line graph illustrated in FIG. 6 based on a difference between the end temperature estimated value (te) stored in the storage unit 21 when the system is shut down (time "B" on the temporal axis illustrated in FIG. 5), which is the temperature estimated value at this time, and the start outer temperature (ts) stored in the storage unit 21 when the system is started up (time "C" on the temporal axis illustrated in FIG. 5), which is the outer temperature at this time.

Figure 6:
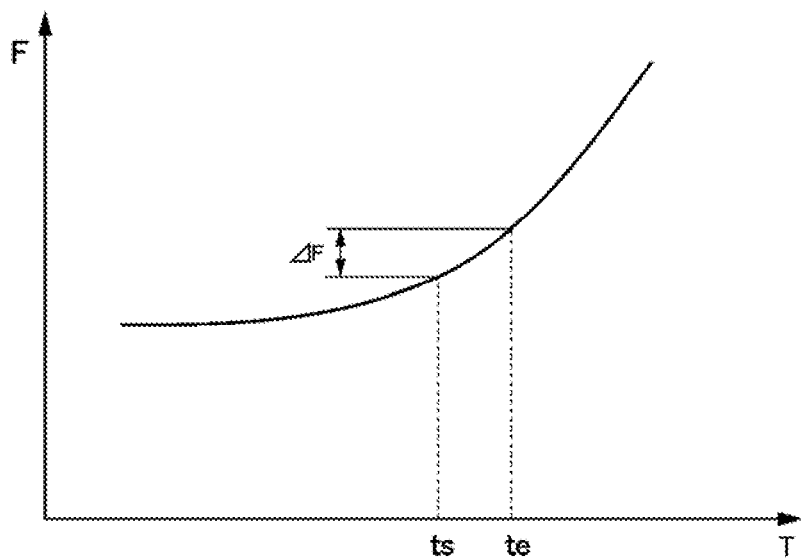
FIG. 6 is a graph illustrating a characteristic line that indicates an example of a relationship between the temperature and the thrust force for calculating a thrust force correction amount.

FIG. 6 is the characteristic line graph (the map) that indicates an example of the relationship between the temperature (t) and the thrust force (F) for calculating the thrust force correction amount $\Delta F$. This characteristic line graph is set (stored in the storage unit 21) in advance by identifying the corresponding relationship between the difference between the end estimated temperature value (te) and the start outer temperature (ts), and the thrust force correction amount $\Delta F$ from an experiment, a simulation, a calculation, or the like so that an appropriate value (a value that is neither insufficient nor excessive) can be set as the corrected target thrust force that should be actually generated by the disk brake 31 (the target thrust force with the thrust force correction amount $\Delta F$ added thereto). Further, a map like a matrix, or a calculation equation may be used, instead of the characteristic line graph illustrated in FIG. 6.

Then, in step 6, the processing circuit 20 calculates the corrected target thrust force that should be actually generated by the disk brake 31, by adding the thrust force correction amount $\Delta F$ calculated with use of the characteristic illustrated in FIG. 6 from the end temperature estimated value (te) and the start outer temperature (ts), to the target thrust force calculated in step 5. The parking brake controller 19 drives the electric actuator 43 so as to achieve the corrected target thrust force calculated in step 6 in response to the actuation request signal for holding of the parking brake.

In step 7, the processing circuit 20 determines whether a request for ending the control by the ECU (the parking brake controller 19) (a request for ending the control by the vehicle system) is issued. In other words, the processing circuit 20 determines whether the system is requested to be shut down by the driver's performing an operation such as switching off the accessory, turning off the ignition, powering off the system, or the like. If the processing circuit 20 determines "NO", i.e., determines that a request for ending the control is not issued in step 7, the processing proceeds to "RETURN" while skipping step 8. Then, the processing circuit 20 repeats the processes of step 1 and the steps thereafter via "START".

On the other hand, if the parking brake controller 19 determines "YES" i.e., determines that a request for ending the control is issued in step 7, the processing proceeds to step 8. In step 8, the processing circuit 20 stores the pad temperature estimated value calculated during immediately preceding execution of step 4 into the storage unit 21 as the temperature at the time of an end of the control by the ECU, i.e., as the end temperature estimated value (te). Then, the processing proceeds to "RETURN". After that, the processing circuit 20 repeats the processes of step 1 and the steps thereafter via "START".

Next, a time chart when the parking brake controller 19 performs the processing illustrated in FIG. 4 will be described with reference to FIG. 5. For example, at time "A" on the temporal axis illustrated in FIG. 5, the actual pad temperature, which is the real temperature of the brake pad 33, and the pad temperature estimated value calculated in step 4 are the same (or substantially the same). After that, the temperature of the brake pad 33 changes according to the state of the vehicle and a braking operation. For example, when the vehicle is braked (a braking force is applied thereto) while running, the temperature increases based on a friction between the brake pad 33 and the disk rotor 4. When the vehicle is parked or the brake is released, the temperature decreases. As described above, the input heat amount and the released heat amount of the brake pad 33 are calculated based on the vehicle speed, the hydraulic pressure in the master cylinder, and the outer temperature, and the temperature of the brake pad 33 can be estimated (calculated) based on these input heat amount and released heat amount. The wheel speed and the deceleration may be used, instead of the vehicle speed and the hydraulic pressure in the master cylinder.

Upon the end of the control by the ECU (the parking brake controller 19) (the control by the vehicle system) at time "B" on the temporal axis illustrated in FIG. 5, the pad temperature estimated value (calculated during immediately preceding execution of step 4) at this time is stored into the storage unit 21 by the processes of steps 7 and 8 as the end temperature estimated value (te).

Power is not supplied to, for example, the parking brake controller 19 so that the pad temperature estimated value is not calculated until the system is started up (the vehicle system is started up and the parking brake controller 19 is started up) at time "C" on the temporal axis illustrated in FIG. 5, i.e., from time "B" to time "C" on the temporal axis illustrated in FIG. 5. Therefore, according to the first embodiment, at time "C" on the temporal axis illustrated in FIG. 5, i.e., when the system is started up (restarted), the outer temperature (ts) detected by the outer temperature sensor 25 at this time is set as the initial value of the temperature estimated value of the brake pad 33 (the pad temperature estimated value) by the processes of steps 1 and 2, and calculation of the pad temperature estimated value is started by the process of the subsequent step, step 4.

When the vehicle starts running from time "C" on the temporal axis illustrated in FIG. 5, the actual temperature of the brake pad 33 decreases due to a release of heat from the brake pad 33, but the pad temperature estimated value is maintained at the initial value (ts) because the temperature of the brake pad 33 never falls below the outer temperature. Then, when a braking operation is performed while the vehicle is running, the temperature of the brake pad 33 increases, and the pad temperature estimated value (the estimated temperature) approaches the actual temperature.

When the actuation request signal for requesting holding of the parking brake is issued at time "D" on the temporal axis illustrated in FIG. 5, the electric actuator 43 is driven so as to achieve the corrected target thrust force calculated in step 6. More specifically, at time "C" on the temporal axis illustrated in FIG. 5, the pad temperature estimated value may become different (lower than) from the actual temperature due to the setting of the outer temperature (ts) at this time as the initial value of the pad temperature estimated value. In step 6, the processing circuit 20 increases the target thrust force calculated based on the pad temperature estimated value at this time in step 5 by the thrust force correction amount ΔF (adds the thrust force correction amount ΔF to the target thrust force) in order to compensate for insufficiency of the thrust force due to the difference between the pad temperature estimated value and the actual temperature, thereby calculating the corrected target thrust force that should be actually generated by the disk brake 31. The thrust force correction amount ΔF is calculated with use of the preset characteristic line graph illustrated in FIG. 6 based on the difference (the temperature difference) between the end temperature estimated value (te) stored in the storage unit 21 when the system is shut down (time "B" on the temporal axis), which is the temperature estimated value at this time, and the start outer temperature (ts) stored in the storage unit 21 when the system is started up (time "C" on the temporal axis), which is the outer temperature at this time.

As such, the first embodiment can ensure that the thrust force actually generated by the disk brake 31 (the braking force as the parking brake) reaches or exceeds a "vehicle stop maintaining required minimum thrust force" ($F_{min}$), which is a weakest thrust force capable of maintaining the vehicle in a stopped state, even when the brake pad 33 is cooled down so that the brake pad 33 thermally contracts accordingly (the thermal expansion amount decreases) at time "E" on the temporal axis, as indicated by the alternate long and short dash line illustrated in FIG. 5. As a result, the first embodiment can prevent (avoid) the thrust force actually generated by the disk brake 33 from becoming insufficient. The above-described thrust force correction amount ΔF is set to a value capable of ensuring that the thrust force actually generated by the disk brake 31 reaches or exceeds the vehicle stop maintaining required minimum thrust force, even with a reduction in the temperature of the brake pad 33 to an expectable lowest temperature (for example, −40 degrees).

Further, the vehicle stop maintaining required minimum thrust force is a weakest thrust force required to maintain the vehicle in a stopped state even when the vehicle is located on a hill, and is determined according to an inclination of a road surface. An estimated inclination value estimated from, for example, a detection value from the acceleration sensor, the inclination sensor, or the like, or state amounts detected from various kinds of sensors can be used as the inclination of the road surface. The alternate long and two short dashes line illustrated in FIG. 5 indicates the thrust force when the electric actuator 43 is driven so as to achieve the target thrust force calculated in step 5. In this case, the thrust force actually generated by the disk brake 31 may fall below the vehicle stop maintaining required minimum thrust force due to thermal contact of the brake pad 33 at time "E" on the temporal axis illustrated in FIG. 5.

The first embodiment allows the brake apparatus to apply an appropriate thrust force (a braking force) after the system is started up next time, without requiring the timer to measure the elapsed time period after the system control is ended.

More specifically, according to the first embodiment, when the system is restarted, the parking brake controller 19 drives the electric actuator 43 while setting a greater thrust force than the target thrust force set according to the temperature estimated value at this time by performing the process of step 5, based on the temperature estimated value (te) when the control is ended by performing the process of step 6. Therefore, the parking brake controller 19 can adjust the thrust force to be generated by driving of the electric actuator 43 after the system is restarted, to an appropriate one based on the temperature estimated value (te) when the control is ended, in consideration of the thrust force decreasing according to, for example, a reduction in the thermal expansion amount (i.e. the parking brake controller 19 can increase the thrust force by an amount corresponding to this decrease). As a result, the first embodiment allows the brake apparatus to appropriately apply the thrust force by driving of the electric actuator 43 even after the system is started up next time, without requiring the timer to measure the elapsed time period after the system control is ended.

According to the first embodiment, when the system control is ended, the parking brake controller 19 ends the control after storing the temperature estimated value at this time into the storage unit 21 as the end temperature estimated value (te) by performing the processes of steps 7 and 8. On the other hand, when the system is restarted after the end of the control, the parking brake controller 19 sets the outer temperature at the time of this restart as the initial value of the temperature estimated value (ts) by performing the processes of steps 1 and 2. In this case, the temperature estimated value calculated by the process of step 4 may become lower than the actual temperature. Therefore, in response to the actuation request signal for requesting holding of the parking brake, the parking brake controller 19 drives the electric actuator 43 so as to achieve the corrected target thrust force calculated by the process of step 6.

More specifically, in step 6, the parking brake controller 19 calculates the corrected target thrust force corresponding to the thrust force that should be actually generated by the disk brake 31, by adding the thrust force correction amount ΔF calculated based on the difference between the end temperature estimated value (te) and the start outer temperature (ts) to the target thrust force set according to the temperature estimated value at this time by the process of step 5. The parking brake controller 19 drives the electric actuator 43 so as to achieve the corrected target thrust force.

Therefore, the parking brake controller 19 can adjust the thrust force to be generated by driving of the electric actuator 43, to an appropriate one in consideration of the thrust force decreasing according to, for example, a reduction in the thermal expansion amount (i.e. the parking brake controller 19 can increase the thrust force by an amount corresponding to this decrease). As a result, the first embodiment allows the brake apparatus to appropriately apply the thrust force by driving of the electric actuator 43 without requiring to measure the elapsed time period from the end of the system control to the startup of the system.

Figure 7:
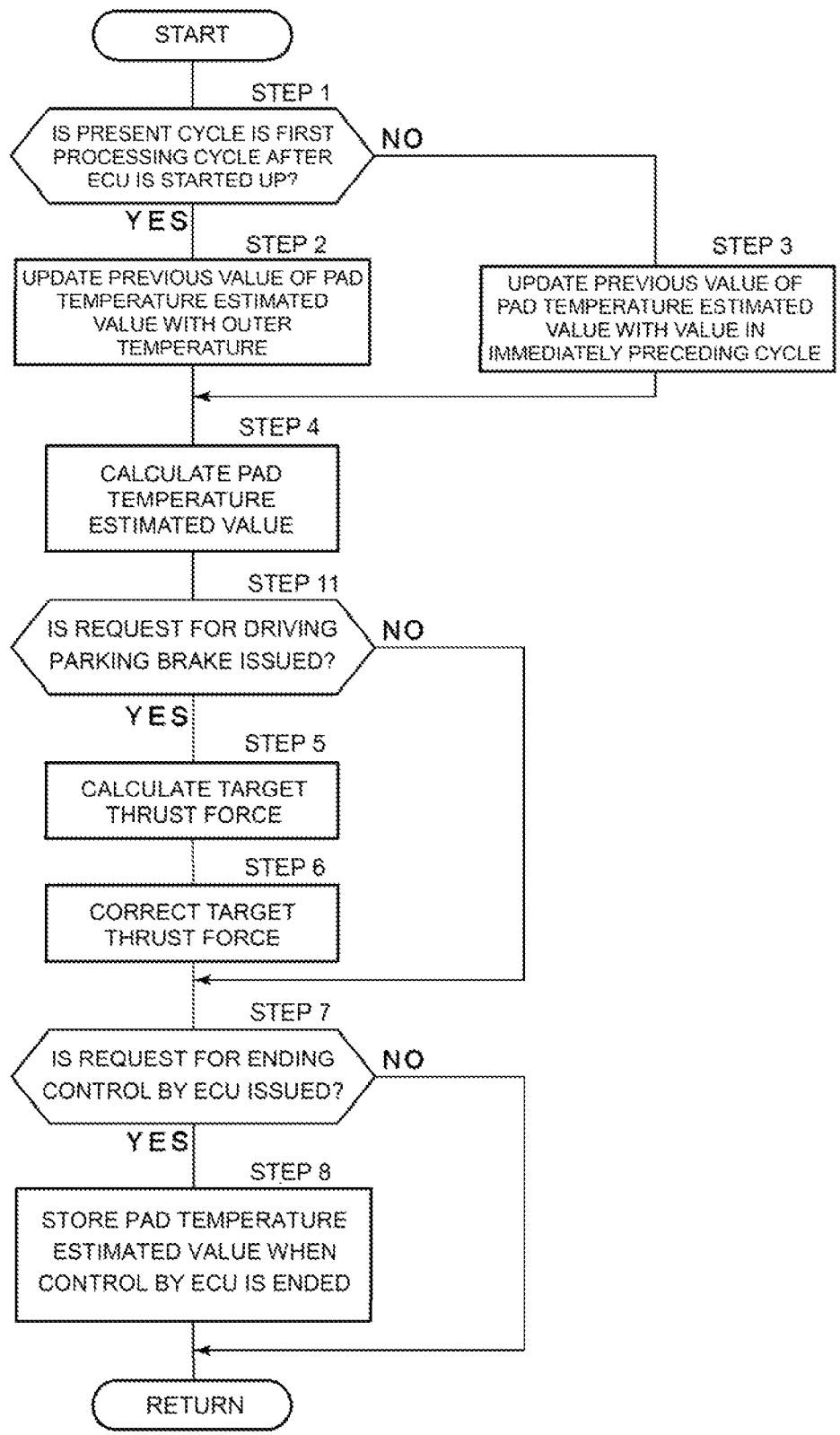
FIG. 7 is a flowchart illustrating control processing performed by a parking brake controller according to a second embodiment.

Next, FIG. 7 illustrates a second embodiment. The present embodiment is characterized in that this is configured to calculate the target thrust force, the thrust force correction amount, and the corrected target thrust force only when the actuation request (the driving request) for holding of the parking brake is issued. In other words, while the above-described first embodiment is configured to calculate the target thrust force, the thrust force correction amount, and the corrected target thrust force constantly (every time for each control cycle), the second embodiment is configured to calculate the target thrust force, the thrust force correction amount, and the corrected target thrust force only when the actuation request (the driving request) for holding of the parking brake is issued. In the following description, the second embodiment will be described, identifying similar components or features to the above-described first embodiment by the same reference numerals, and omitting descriptions thereof.

The processes of steps 1 to 8 illustrated in FIG. 7 are similar to the processes of steps 1 to 8 illustrated in FIG. 4 according to the above-described first embodiment. In the second embodiment, a process of step 11 is added between steps 4 and 5. In step 11, which is a step subsequent to step 4, the processing circuit 20 determines whether a request for driving of the parking brake is issued, i.e., whether the actuation request signal for requesting holding of the parking brake is output by the parking brake switch 18 or according to the above-described parking brake holding or release determination logic.

If the processing circuit 20 determines "YES", i.e., determines that the actuation request signal for requesting holding of the parking brake is output in step 11, the processing proceeds to step 5. On the other hand, if the processing circuit 20 determines "NO", i.e., determines that the actuation request signal for requesting holding of the parking brake is not output in step 11, the processing proceeds to step 7 while skipping steps 5 and 6.

The second embodiment is configured to determine whether the actuation request signal for requesting holding of the parking brake is output in step 11 as described above, while a basic effect and result thereof is not significantly different from the above-described first embodiment. Especially, according to the second embodiment, the processing circuit 20 calculates the target thrust force, the thrust force correction amount, and the corrected target thrust force by performing the processes of steps 5 and 6 only when the processing circuit 20 determines that the actuation request signal for requesting holding of the parking brake is output. Therefore, the second embodiment can reduce a processing load imposed on the ECU (the parking brake controller 19).

Figure 8:
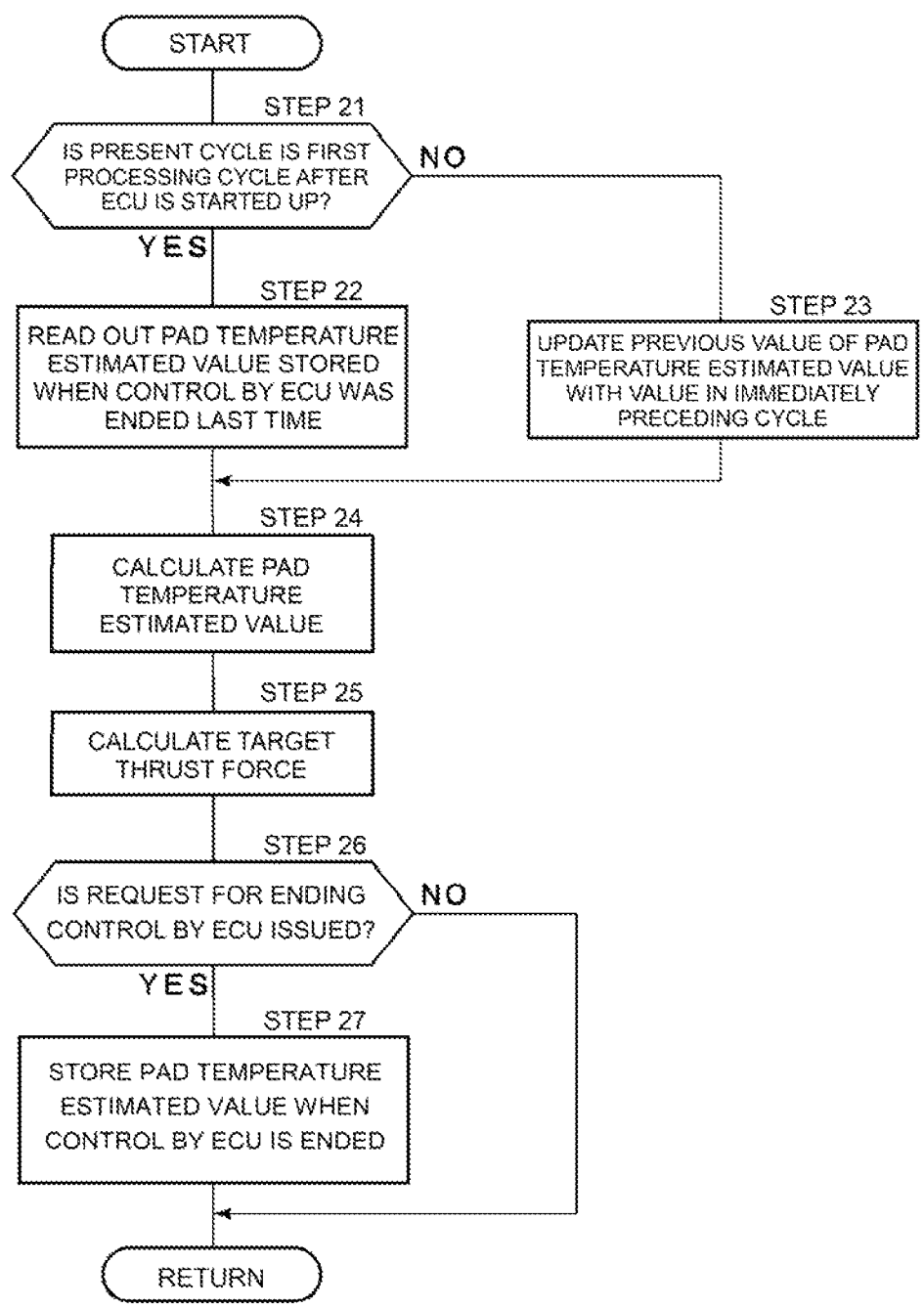
FIG. 8 is a flowchart illustrating control processing performed by a parking brake controller according to a third embodiment.
Figure 9:
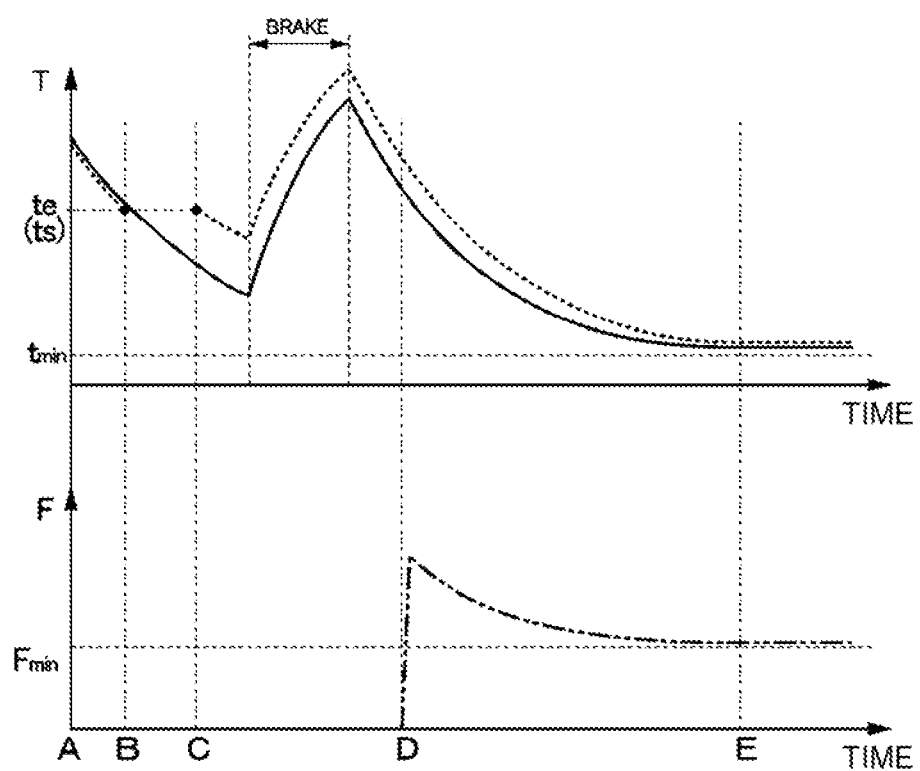
FIG. 9 is a graph illustrating characteristic lines that indicate examples of the temporal changes in the pad temperature and the thrust force of the parking brake.

Next, FIGS. 8 and 9 illustrate a third embodiment of the present invention. The present embodiment is characterized in that this is configured to set the end temperature estimated value, which is the temperature estimated value of the frictional member when the system control is ended, as the initial value of the temperature estimated value when the system is started up after that. In the following description, the third embodiment will be described, identifying similar components or features to the above-described first embodiment by the same reference numerals, and omitting descriptions thereof.

According to the third embodiment, when the system of the parking brake controller 19 is restarted after the system control is ended, the parking brake controller 19 drives the electric actuator 43 while also setting a greater thrust force than the target thrust force set according to the temperature estimated value at this time, based on the temperature estimated value at the time of the end of the control, in a substantially similar manner to the first embodiment.

Therefore, the parking brake controller 19 includes the estimated temperature calculation device that estimates the temperature of the brake pad 33 to calculate the temperature estimated value (the pad temperature estimated value) (corresponding to a process of step 24 illustrated in FIG. 8). Further, the parking brake controller 19 includes the control end unit that ends the control after storing the temperature estimated value at that time into the storage unit 21 as the end temperature estimated value (te) when the system control is ended (when the control by the vehicle system is ended) (corresponding to processes of steps 26 and 27 illustrated in FIG. 8).

Then, when the system is restarted after the control is ended, the parking brake controller 19 sets the end temperature estimated value (te) as the temperature estimated value (the initial value thereof) (updates the temperature estimated value). Setting the end temperature estimated value (te) as the initial value of the temperature estimated value in this manner may cause the temperature estimated value, which is calculated (estimated) by the estimated temperature calculation device during the control, to become higher than the actual temperature (the real temperature indicated by a solid line illustrated in FIG. 9), as indicated by a broken line illustrate in FIG. 9, which will be described below. More specifically, after the system is started up, the temperature estimated value approaches the actual temperature (the real temperature) according to passage of the driving time period, use of the brake (application of the braking force), and the like. However, for example, when only a short time period has elapsed from a startup of the system, the temperature estimated value may become higher than the actual temperature (the real temperature) according to the temperature estimated value when the control is ended, the time period elapsed from the shutdown of the system to the startup of the system, the outer temperature at that time, and the like.

Therefore, according to the third embodiment, the parking brake controller 19 drives the electric actuator 43 so as to achieve the target thrust force set according to the temperature estimated value at that time (the temperature estimated value that may become higher than the actual temperature) when the actuation request signal for requesting holding of the parking brake is output by the parking brake switch 18 or according to the above-described parking brake holding or release determination logic. As a result, the parking brake controller 19 can adjust the thrust force (the braking force as the parking brake) to be generated by driving of the electric actuator 43, to an appropriate one in consideration of the thrust force decreasing according to, for example, a reduction in the thermal expansion amount of the brake pad 33 (i.e. the parking brake controller 19 can adjust increase the thrust force by an amount corresponding to this decrease).

Next, control processing performed by the processing circuit 20 of the parking brake controller 19 (processing for calculating the thrust force that should be generated) will be described.

Step 21 illustrated in FIG. 8 is similar to step 1 illustrated in FIG. 4 according to the above-described first embodiment. If the processing circuit 20 determines "YES", i.e., determines that the present cycle is the first control cycle after the startup (for example, time "C" on the temporal axis illustrated in FIG. 9) in step 21, the processing proceeds to step 22. In step 22, the processing circuit 20 updates the previous value of the temperature estimated value for use in estimation of the temperature of the brake pad 33 to be performed in step 24, which will be described below, with the end temperature estimated value (te) stored in the storage unit 21 when the system is shut down (for example, time "B" on the temporal axis illustrated in FIG. 9), which is the temperature estimated value at this time, by performing a process of step 27, which will be described below.

In other words, the end temperature estimated value (te) is set as the initial value of the temperature estimated value (the pad temperature estimated value) of the brake pad 33. Setting the end temperature estimated value (te) as the initial value of the temperature estimated value in this manner may cause the estimated temperature (the temperature estimated value) to become higher than the actual temperature (the real temperature) as indicated in a time period from time "C" to time "E" on the temporal axis illustrated in FIG. 9. As a result, according to the third embodiment, the parking brake controller 19 can drive the electric actuator 43 while increasing the thrust force without requiring the process of step 6 (the correction of the thrust force) illustrated in FIG. 4 according to the first embodiment.

Steps 23 to 25 illustrated in FIG. 8 are similar to steps 3 to 5 illustrated in FIG. 4 according to the first embodiment. Steps 26 and 27 illustrated in FIG. 8 are similar to steps 7 and 8 illustrated in FIG. 4 according to the first embodiment.

Next, a time chart when the processing illustrated in FIG. 8 is performed by the parking brake controller 19 will be described with reference to FIG. 9. In FIG. 9, an upper side of a vertical axis indicates the relationship between the pad temperature (t) and the time (Time) in a similar manner to the above-described drawing, FIG. 5. In particular, a solid line represents the actual temperature, and a broken line represents the temperature estimated value. Further, a lower side of the vertical axis indicates the relationship between the thrust force (F) of the parking brake and the time (Time). In particular, an alternate long and two short dashes line represents the thrust force calculated based on the temperature estimated value. For example, the actual pad temperature, which is the real temperature of the brake pad 33, and the pad temperature estimated value calculated in step 24 are the same (or substantially the same) on time "A" on the temporal axis illustrated in FIG. 9. After that, the temperature of the brake pad 33 changes according to the state of the vehicle and a braking operation.

Upon the end of the control by the ECU (the parking brake controller 19) (the control by the vehicle system) on time "B" on the temporal axis illustrated in FIG. 9, the pad temperature estimated value at this time (calculated during immediately preceding execution of step 24) is stored into the storage unit 21 as the end temperature estimated value (te) by the processes of steps 26 and 27.

Until the system is started up (the vehicle system is started up and the parking brake controller 19 is started up) on time "C" on the temporal axis illustrated in FIG. 9, i.e., during a time period from time "B" to time "C" on the temporal axis illustrated in FIG. 9, power is not supplied to, for example, the parking brake controller 19 so that the pad temperature estimated value is not calculated. Therefore, according to the third embodiment, at time "C" on the temporal axis illustrated in FIG. 9, i.e., when the system is started up (restarted), the end temperature estimated value (te) stored in the storage unit 21 on time "B" on the temporal axis illustrated in FIG. 9 is set as the initial value of the temperature estimated value of the brake pad 33 (the pad temperature estimated value) by the processes of steps 21 and 22, and calculation of the pad temperature estimated value is started by the process of the subsequent step, step 24.

After the vehicle starts running at time "C" on the temporal axis illustrated in FIG. 9, the actual temperature of the brake pad 33 decreases due to a release of heat from the brake pad 33, whereby the pad temperature estimated value also decreases. Then, when a braking operation is performed while the vehicle is running, the temperature of the brake pad 33 increases and the pad temperature estimated value (the estimated temperature) approaches the actual temperature.

When the actuation request signal for requesting holding of the parking brake is output at time "D" on the temporal axis illustrated in FIG. 9, the electric actuator 43 is driven so as to achieve the target thrust force calculated in step 25. In this case, the pad temperature estimated value may become different from (higher than) the actual temperature, because the end temperature estimated value (te) is set as the initial value of the pad temperature estimated value at time "C" on the temporal axis illustrated in FIG. 9. Therefore, the target thrust force calculated based on the pad temperature estimated value at this time in step 25 is greater than the target thrust force that would be calculated on the actual temperature. As a result, the thrust force actually generated by the disk brake 31 (the braking force as the parking brake) can be maintained greater than the vehicle stop maintaining required minimum thrust force ($F_{min}$), which is the weakest thrust force capable of maintaining the vehicle in a stopped state, even with a reduction in the temperature of the brake pad 33 and occurrence of thermal contraction of the brake pad 33 (a reduction in the thermal expansion amount) according thereto on time "E" on the temporal axis as indicated by the alternate long and two short dashes line in FIG. 9. As a result, the third embodiment can prevent (avoid) the thrust force actually generated by the disk brake 31 from becoming insufficient.

The third embodiment also allows the brake apparatus to apply an appropriate thrust force (braking force) even after the system is started up next time, without requiring the timer to measure the elapsed time period after the system control is ended, in a similar manner to the above-described first embodiment.

In other words, according to the third embodiment, when the system is restarted, the parking brake controller 19 can drive the electric actuator 43 based on setting of a greater thrust force than the target thrust force that would be set with use of the actual temperature at this time as the temperature estimated value. Therefore, the parking brake controller 9 can adjust the thrust force to be generated by driving of the electric actuator 43 after the system is restarted, to an appropriate one based on the temperature estimated value (te) when the control is ended, in consideration of the thrust force decreasing according to, for example, a reduction in the thermal expansion amount (i.e. the parking brake controller 9 can increase the thrust force by an amount corresponding to this decrease). As a result, the third embodiment allows the brake apparatus to appropriately apply the thrust force by driving of the electric actuator 43 even after the system is started up next time, without requiring the timer to measure the elapsed time period after the system control is ended.

According to the third embodiment, when ending the system control, the parking brake controller 19 ends the control after storing the temperature estimated value at this time into the storage unit 21 as the end temperature estimated value (te) by performing the processes of steps 26 and 27. On the other hand, when the system is restarted after the end of the control, the parking brake controller 19 sets the end temperature estimated value (te) as the initial value of the temperature estimated value (ts) by performing the process of steps 21 and 22, and drives the electric actuator 43 so as to achieve the target thrust force calculated in step 25.

In other words, because the parking brake controller 19 sets the end temperature estimated value (te) as the initial value (ts) of the temperature estimated value when the system is restarted, this temperature estimated value may become higher than the actual temperature. Then, the parking brake controller 19 drives the electric actuator 43 so as to achieve the target thrust force set according to the temperature estimated value higher than the actual temperature. Therefore, the parking brake controller 19 can adjust the thrust force to be generated by driving of the electric actuator 43, to an appropriate one, in consideration of the thrust force decreasing according to, for example, a reduction in the thermal expansion amount (i.e. the parking brake controller 19 can increase the thrust force by an amount corresponding to this decrease). As a result, the third embodiment allows the brake apparatus to appropriately apply the thrust force by driving of the electric actuator 43, without requiring the timer to measure the elapsed time period from the end of the system control to the startup of the system.

Figure 10:
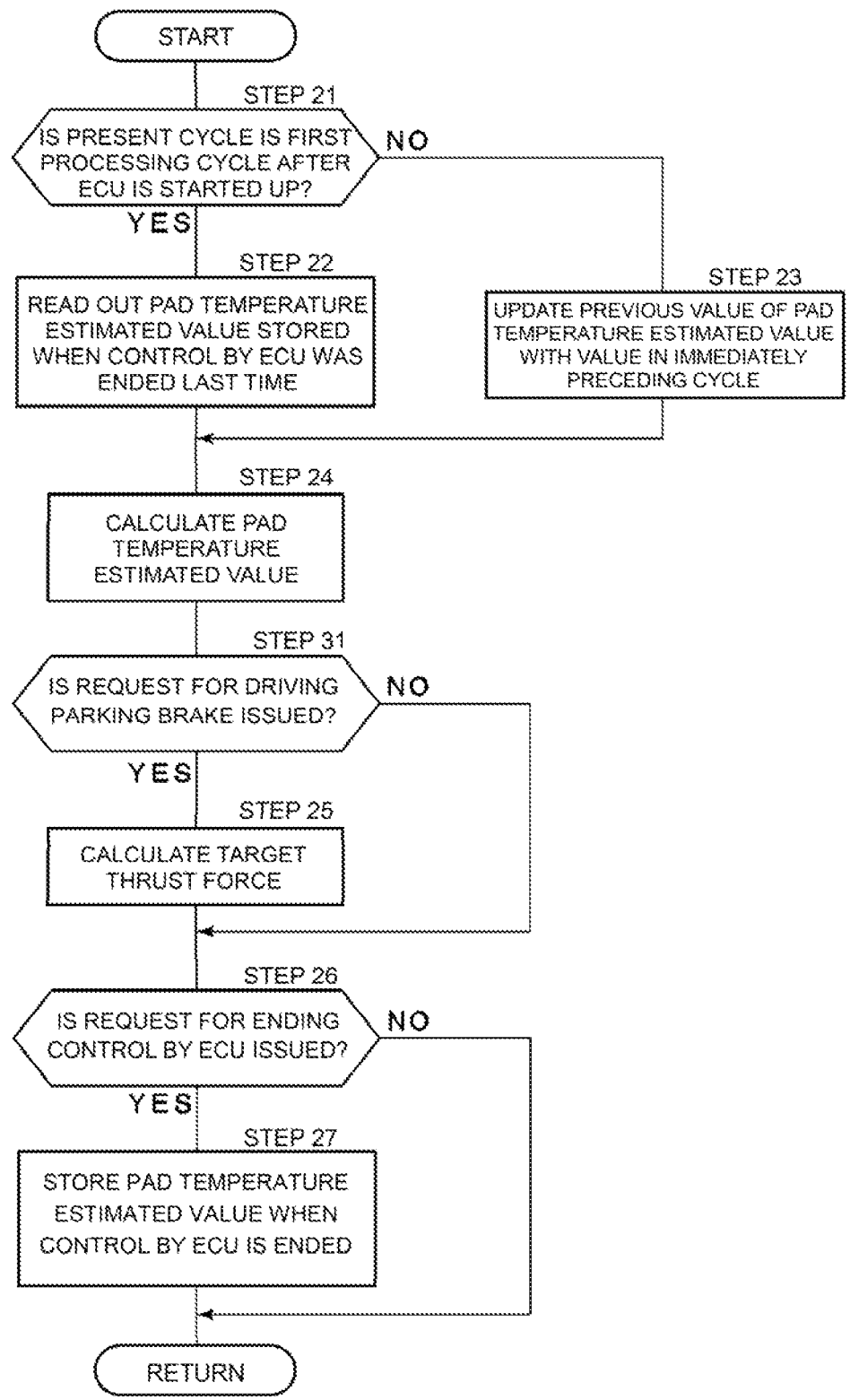
FIG. 10 is a flowchart illustrating control processing performed by a parking brake controller according to a fourth embodiment.

Next, FIG. 10 illustrates a fourth embodiment of the present invention. The present embodiment is characterized in that this is configured to calculate the target thrust force only when the actuation request (the driving request) for holding of the parking brake is issued. In other words, while the above-described third embodiment is configured to calculate the target thrust force constantly (every time for each control cycle), the fourth embodiment is configured to calculate the target thrust force when the actuation request (the driving request) for holding of the parking brake is issued. In the following description, the fourth embodiment will be described, identifying similar components or features to the above-described first and third embodiments by the same reference numerals, and omitting descriptions thereof.

The processes of steps 21 to 27 illustrated in FIG. 10 are similar to the processes of steps 21 to 27 illustrated in FIG. 8 according to the above-described third embodiment. In the fourth embodiment, a process of step 31 is added between steps 24 and 25. In step 31, which is a step subsequent to step 24, the processing circuit 20 determines whether a request for driving of the parking brake is issued, i.e., whether the actuation request signal for requesting holding of the parking brake is output by the parking brake switch 18 or according to the above-described parking brake holding or release determination logic.

If the processing circuit 20 determines "YES", i.e., determines that the actuation request signal for requesting holding of the parking brake is output in step 31, the processing proceeds to step 25. On the other hand, if the processing circuit 20 determines "NO", i.e., determines that the actuation request signal for requesting holding of the parking brake is not output in step 31, the processing proceeds to step 26 while skipping step 25.

The fourth embodiment is configured to determine whether the actuation request signal for requesting holding of the parking brake is output in step 31 as described above, while a basic effect and result thereof is not significantly different from the above-described third embodiment. Especially, according to the fourth embodiment, the processing circuit 20 calculates the target thrust force by performing the process of step 25 only when the processing circuit 20 determines that the actuation request signal for requesting holding of the parking brake is output. Therefore, the fourth embodiment can reduce a processing load imposed on the ECU (the parking brake controller 19).

In the above-described first embodiment, the process of step 4 illustrated in FIG. 4 corresponds to a specific example of the estimated temperature calculation device, which is a constituent element of the present invention, and the processes of steps 7 and 8 illustrated in FIG. 4 correspond to a specific example of the control end unit, which is a constituent element of the present invention.

In the above-described second embodiment, the process of step 4 illustrated in FIG. 7 corresponds to a specific example of the estimated temperature calculation device, which is a constituent element of the present invention, and the processes of steps 7 and 8 illustrated in FIG. 7 correspond to a specific example of the control end unit, which is a constituent element of the present invention.

In the above-described third embodiment, the process of step 24 illustrated in FIG. 8 corresponds to a specific example of the estimated temperature calculation device, which is a constituent element of the present invention, and the processes of steps 26 and 27 illustrated in FIG. 8 correspond to a specific example of the control end unit, which is a constituent element of the present invention.

In the above-described fourth embodiment, the process of step 24 illustrated in FIG. 10 corresponds to a specific example of the estimated temperature calculation device, which is a constituent element of the present invention, and the processes of steps 26 and 27 illustrated in FIG. 10 correspond to a specific example of the control end unit, which is a constituent element of the present invention.

The above-described respective embodiments have been described based on the example in which the estimated temperature calculation device is configured to estimate (calculate) the temperature of the brake pad 33 from the vehicle speed, the hydraulic pressure in the master cylinder, and the outer temperature. However, the present invention is not limited thereto, and the estimated temperature calculation device may estimate (calculate) the temperature of the brake pad 33 with use of the wheel speed and the deceleration, instead of the vehicle speed and the hydraulic pressure in the master cylinder. Further, the estimated temperature calculation device may be configured to estimate (calculate) the temperature of the brake pad 33 or correct the estimated temperature in consideration of an environment around the vehicle such as how much or whether moisture (water or snow) is attached to the brake pad 33 due to rain or snow.

The above-described respective embodiments have been described based on the example in which the disk brake 31 equipped with the electric parking brake function is used as each of the brakes on the left and right rear wheel sides. However, the present invention is not limited thereto. For example, the disk brake equipped with the electric parking brake function may be used as each of brakes on the all wheels (all four wheels). In other words, the present invention can be carried out by using the disk brake equipped with the electric parking brake function as brakes on at least a pair of wheels of the vehicle.

The above-described embodiments have been described based on the example in which the disk brake equipped with the electric parking brake is embodied by the hydraulic disk brake 31 equipped with the electric parking brake. However, the present invention is not limited thereto. For example, the disk brake equipped with the electric parking brake may be embodied by an electric disk brake that does not require hydraulic supply. Further, the brake apparatus is not limited to the disk brake type brake apparatus. For example, the brake apparatus may be configured as a drum brake type brake apparatus. Further, for example, the brake apparatus may be configured as a drum-in disk brake in which a drum type electric parking brake is provided in a disk brake.

According to the above-described embodiments, it is possible to apply an appropriate thrust force (braking force) after the ignition is turned on (the system is started up) next time, without requiring the timer to measure the elapsed time period after the ignition is turned off (the system control is ended).

More specifically, according to some of the above-described embodiments, when the system is restarted, the controller is configured to drive the electric motor while setting a greater thrust force than the target thrust force set according to the temperature estimated value at this time, based on the temperature estimated value when the control is ended. Further, according to these embodiments, when the system is restarted after the control by the system of the controller is ended, the controller is configured to drive the electric motor while setting a greater thrust force than the target thrust force set according to the temperature estimated value at this time. Therefore, the controller can adjust the thrust force to be generated by driving of the electric actuator after the system is restarted, to an appropriate one based on the temperature estimated value when the control is ended, in consideration of the thrust force decreasing according to, for example, a reduction in the thermal expansion amount (i.e. the controller can increase the thrust force by an amount corresponding to this decrease). As a result, these embodiments allows the brake apparatus to appropriately apply the thrust force by driving of the electric motor even after the ignition is turned on (the system is started up) next time, without requiring the timer to measure the elapsed time period after the ignition is turned off (the system control is ended).

According to these embodiments, the controller includes the control end device that ends the control after storing the temperature estimated value at that time as the end temperature estimated value when ending the system control, and is configured to set the outer temperature at the time of the restart as the temperature estimated value when the system is restarted after the control is ended, and drive the electric motor after adding the thrust force of the pressing member holding mechanism, which is calculated based on the difference temperature value between the stored temperature estimated value and the end temperature estimated value stored when the control is ended, to the target thrust force set according to the temperature estimated value at this time.

In this case, because the outer temperature is set as the temperature estimated value of the friction member when the system is restarted, this temperature estimated value may become lower than the actual temperature. However, the electric motor is driven so as to achieve the corrected target thrust force calculated by adding the thrust force (the thrust force correction amount) calculated based on the difference between the temperature estimated value when the system is restarted (the start outer temperature) and the end temperature estimated value, to the target thrust force set according to the temperature estimated value at this time. Therefore, the controller can adjust the thrust force to be generated by driving of the electric motor, to an appropriate one in consideration of the thrust force decreasing according to, for example, a reduction in the thermal expansion amount (i.e. the controller can increase the thrust force by an amount corresponding to this decrease). As a result, these embodiments allow the brake apparatus to appropriately apply the thrust force by driving of the electric motor without requiring the elapsed time period since the ignition is turned off (the system control is ended) until the ignition is turned on (the system is started up).

According to the other of the above-described embodiments, the controller is configured to drive the electric motor based on the temperature estimated value at the time of the end of the control, when the system is restarted after the control by the system of the controller is ended. Further, according to these embodiments, the controller includes the control end device that ends the control after storing the temperature estimated value at that time as the end temperature estimated value when the system control is ended, and is configured to drive the electric motor with use of the end temperature estimated value as the temperature estimated value when the system is restarted after the control is ended.

In this case, because the end temperature estimated value is set as the temperature estimated value of the friction member when the system is restarted, this temperature estimated value may become higher than the actual temperature. Then, the electric motor is driven so as to achieve the target thrust force set according to the temperature estimated value higher than the actual temperature. Therefore, the controller can adjust the thrust force to be generated by driving of the electric motor, to an appropriate one in consideration of the thrust force decreasing according to, for example, a reduction in the thermal expansion amount (i.e. the controller increase the thrust force by an amount corresponding to this decrease). As a result, these embodiments allow the brake apparatus to appropriately apply the thrust force by driving of the electric motor without requiring the elapsed time period since the ignition is turned off (the system control is ended) until the ignition is turned on (the system is started up).

The brake apparatus according to the above-described embodiments does not require the timer to measure the elapsed time after the system control is ended, and can apply an appropriate thrust force (braking force) when the system is restarted next time.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2013-227382 filed on Oct. 31, 2013. The entire disclosure of No. 2013-227382 filed on Oct. 31, 2013 including specification, claims, drawings and summary is incorporated herein by reference in its entirety.

The entire disclosure of Japanese Patent Application Public Disclosure No. 2012-192874 and No. 2006-307994, including specification, claims, drawings and summary is incorporated herein by reference in its entirety.

What is claimed is:

1. A brake apparatus comprising:
a brake mechanism configured to thrust a frictional member disposed so as to be able to abut against a rotational member configured to rotate together with a wheel of a vehicle, with use of a pressing member based on an operation performed on a brake pedal;
a pressing member holding mechanism configured to thrust the pressing member by an electric motor and hold the pressing member at the thrust position;
an estimated temperature calculation device configured to estimate a temperature of the frictional member to calculate a temperature estimated value; and
a controller electrically connected to the electric motor, and configured to drive the electric motor in such a manner that a thrust force of the pressing member holding mechanism matches a target thrust force, wherein, the controller is configured to determine the target thrust force according to the temperature estimated value of the frictional member, and
when the controller is restarted after the controller is turned off, the controller drives the electric motor in such a manner that the thrust force of the pressing member holding mechanism matches a corrected target thrust force calculated by setting, based on the temperature estimated value of the frictional member at said time when the controller is turned off, a greater thrust force than the target thrust force set according to the temperature estimated value of the frictional member at said time of the restart.

2. The brake apparatus according to claim 1, wherein the controller includes a control end unit configured to, when the controller is turned off, store the temperature estimated value at said time when the controller is turned off as an end temperature estimated value, and turn off the controller, and
wherein, when the controller is restarted after the controller is turned off, the controller sets an outer temperature at said time of the restart as the temperature estimated value, and calculates the corrected target thrust force by adding a thrust force of the pressing member holding mechanism calculated based on a difference temperature value between the set temperature estimated value and the end temperature estimated value stored at said time when the controller is turned off, to the target thrust force set according to the temperature estimated value at said time of the restart.

3. The brake apparatus according to claim 2, wherein the controller stores a characteristic that indicates a relationship between the temperature of the frictional member and the thrust force of the pressing member, and calculates the thrust force to be added to the target thrust force by associating the difference temperature value with the characteristic.

4. The brake apparatus according to claim 2, wherein the controller constantly calculates the thrust force to be added to the target thrust force from when the controller is restarted until the controller is turned off.

5. The brake apparatus according to claim 3, wherein the controller constantly calculates the thrust force to be added to the target thrust force from when the controller is restarted until the controller is turned off.

6. The brake apparatus according to claim 2, wherein the controller calculates the thrust force to be added to the target thrust force in response to an actuation request signal for actuating the pressing member holding mechanism to hold the pressing member.

7. The brake apparatus according to claim 3, wherein the controller calculates the thrust force to be added to the target thrust force in response to an actuation request signal for actuating the pressing member holding mechanism to hold the pressing member.

8. The brake apparatus according to claim 1, wherein the estimated temperature calculation device is included in the controller.

9. A brake apparatus comprising:
a brake mechanism configured to thrust a frictional member disposed so as to be able to abut against a rotational member configured to rotate together with a wheel of a vehicle, with use of a pressing member based on an operation performed on a brake pedal;
a pressing member holding mechanism configured to thrust the pressing member by an electric motor and hold the pressing member at the thrust position;
an estimated temperature calculation device configured to estimate a temperature of the frictional member to calculate a temperature estimated value; and
a controller electrically connected to the electric motor, and configured to drive the electric motor in such a manner that a thrust force of the pressing member holding mechanism matches a target thrust force determined based on the temperature estimated value,
wherein, when the controller is restarted after the controller is turned off, the controller drives the electric motor based on the temperature estimated value of the frictional member at said time when the controller is turned off.

10. The brake apparatus according to claim 9, wherein the controller includes a control end unit configured to, when the controller is turned off, store the temperature estimated value at said time when the controller is turned off as an end temperature estimated value, and turn off the controller, and
wherein, when the controller is restarted after the controller is turned off, the controller drives the electric motor based on the stored end temperature estimated value.

11. The brake apparatus according to claim 10, wherein the controller stores a characteristic that indicates a relationship between the temperature of the frictional member and the thrust force of the pressing member, and calculates the target thrust force by associating the temperature estimated value with the characteristic.

12. The brake apparatus according to claim 9, wherein the estimated temperature calculation device is included in the controller.

13. A brake apparatus comprising:
 a brake mechanism configured to thrust a frictional member disposed so as to be able to abut against a rotational member configured to rotate together with a wheel of a vehicle, with use of a pressing member based on an operation performed on a brake pedal;
 a pressing member holding mechanism configured to thrust the pressing member by an electric motor and hold the pressing member at the thrust position;
 an estimated temperature calculation device configured to estimate a temperature of the frictional member to calculate a temperature estimated value; and
 a controller electrically connected to the electric motor, and configured to drive the electric motor in such a manner that a thrust force of the pressing member holding mechanism matches a target thrust force, wherein, the controller is configured to determine the target thrust force based on the temperature estimated value, and
 when the controller is restarted after the controller is turned off, the controller drives the electric motor in such a manner that the thrust force of the pressing member holding mechanism matches a target thrust force calculated by setting a greater thrust force than the target thrust force set according to the temperature estimated value at said time of the restart.

14. The brake apparatus according to claim 13, wherein the estimated temperature calculation device is included in the controller.

* * * * *